US007622844B1

(12) United States Patent
Kuhlmann-Wilsdorf

(10) Patent No.: US 7,622,844 B1
(45) Date of Patent: Nov. 24, 2009

(54) METAL FIBER BRUSH INTERFACE CONDITIONING

(75) Inventor: Doris Kuhlmann-Wilsdorf, Charlottesville, VA (US)

(73) Assignee: Hipercon, LLC, Charlottesville, VA (US)

( * ) Notice: Subject to any disclaimer, the term of this patent is extended or adjusted under 35 U.S.C. 154(b) by 669 days.

(21) Appl. No.: 11/024,177

(22) Filed: Dec. 29, 2004

Related U.S. Application Data

(60) Provisional application No. 60/532,921, filed on Dec. 30, 2003.

(51) Int. Cl.
*H02K 13/00* (2006.01)

(52) U.S. Cl. ........................ 310/251; 310/248; 310/229; 310/249; 310/252; 310/253; 310/242; 439/13

(58) Field of Classification Search ................. 310/248, 310/251, 229, 242, 252, 253, 249; 439/13
See application file for complete search history.

(56) References Cited

U.S. PATENT DOCUMENTS

| | | | | | |
|---|---|---|---|---|---|
| 2,313,129 | A | * | 3/1943 | Dohan William R | 310/333 |
| 2,518,861 | A | * | 8/1950 | Burtch Joel A | 369/144 |
| 3,807,041 | A | * | 4/1974 | McDougall | 29/599 |
| 3,847,651 | A | * | 11/1974 | Holden et al. | 428/315.9 |
| 4,358,699 | A | * | 11/1982 | Wilsdorf | 310/251 |
| 4,407,062 | A | * | 10/1983 | Sutcliffe et al. | 29/599 |
| 4,415,629 | A | * | 11/1983 | Palumbo et al. | 428/375 |
| 4,415,635 | A | * | 11/1983 | Wilsdorf et al. | 428/611 |
| 5,063,125 | A | * | 11/1991 | Yuh et al. | 430/58.75 |
| 5,073,233 | A | * | 12/1991 | Banks et al. | 216/48 |
| 5,846,761 | A | * | 12/1998 | Rambach | 435/34 |
| 5,849,761 | A | * | 12/1998 | Yaksh | 514/327 |
| 5,902,681 | A | * | 5/1999 | Ueoka et al. | 428/383 |
| 5,908,853 | A | * | 6/1999 | Nahoum | 514/341 |
| 5,930,075 | A | * | 7/1999 | Khan et al. | 360/99.08 |
| 6,319,604 | B1 | * | 11/2001 | Xu | 428/379 |
| 6,529,474 | B1 | * | 3/2003 | Bonneau et al. | 370/230 |
| 6,550,117 | B1 | * | 4/2003 | Tokuoka et al. | 29/25.42 |
| 6,591,495 | B2 | * | 7/2003 | Hirose et al. | 29/846 |
| 6,628,036 | B1 | * | 9/2003 | Lynch et al. | 310/242 |
| 6,773,627 | B2 | * | 8/2004 | Lynch et al. | 252/299.01 |
| 2003/0107294 | A1 | * | 6/2003 | Otani et al. | 310/252 |
| 2003/0155837 | A1 | * | 8/2003 | Takahashi et al. | 310/253 |
| 2003/0217864 | A1 | * | 11/2003 | Ishikawa et al. | 174/135 |
| 2004/0000836 | A1 | * | 1/2004 | Okubo et al. | 310/252 |
| 2004/0150326 | A1 | * | 8/2004 | Shibata | 313/503 |
| 2004/0170586 | A1 | * | 9/2004 | Ferrari et al. | 424/63 |
| 2004/0191331 | A1 | * | 9/2004 | Schwartz et al. | 424/641 |
| 2004/0207312 | A1 | * | 10/2004 | Takashima et al. | 313/503 |
| 2004/0212272 | A1 | * | 10/2004 | Arai et al. | 310/251 |
| 2004/0234706 | A1 | * | 11/2004 | Uehira et al. | 428/1.3 |
| 2004/0254297 | A1 | * | 12/2004 | Hsu et al. | 525/54.2 |

* cited by examiner

*Primary Examiner*—Quyen Leung
*Assistant Examiner*—John K Kim
(74) *Attorney, Agent, or Firm*—Oblon, Spivak, McClelland, Maier & Neustadt, L.L.P.

(57) ABSTRACT

An electrical brush having at least one conductive element and at least one conditioning material coated on the at least one conductive element wherein the conditioning material has a composition and thickness on the conductive element such that, as deposited on a moving contact surface in the course of brush operation, the conditioning material can have an average film thickness S<~1 μm so that current can be conducted by means of electron tunneling through a film thickness of the deposited conditioning material of $S_i \leqq 12$ nm thickness over a fractional area $f_C$, greater than 0.01 of a foot print of the conductive element in a current conductive area.

32 Claims, 8 Drawing Sheets

| Material | Conc. (g in 100mL solvent) co | Film. Thickness S [nm] | Ave Layer. Thickness, sc[micron] | Avg. Coeff. Friction per brush | Friction Range per brush |
|---|---|---|---|---|---|
| Carnauba Wax | 0.2 | 2.3 | 0.14 | 0.5 | 0.2-1.5 |
| Carnauba Wax | 0.3 | 3.4 | 0.21 | 3.4 | 0.2-0.5 |
| Paraffin | 0.1 | 1.1 | 0.07 | 0.6 | 0.2-1.0 |
| Paraffin | 0.2 | 2.3 | 0.14 | 0.4 | 0.25-1.0 |
| Paraffin | 0.3 | 3.4 | 0.21 | 0.4 | 0.25-0.6 |
| Paraffin | 0.5 | 5.7 | 0.35 | 0.45 | 0.35-0.6 |
| Petroleum Jelly | 0.7 | 7.9 | 0.39 | 0.25 | 0.1-0.5 |
| Petroleum Jelly | 0.9 | 10 | 0.63 | 0.3 | 0.2-0.4 |
| Lanolin | 0.1 | 1.1 | 0.07 | 0.5 | 0.3-1.0 |
| Lanolin | 0.5 | 5.7 | 0.35 | 0.8 | 0.5-1.5 |
| Lanolin | 0.6 | 6.8 | 0.42 | No Data | No Data |
| Lanolin | 0.8 | 9 | 0.56 | No Data | No Data |
| Lanolin | 0.1 | 11 | 0.7 | 0.5 | 0.25-0.6 |
| Lanolin | 3.3 | 37 | 2.3 | 0.5 | 0.4-1.0 |
| Alconox | 0.5 | 5.7 | 0.35 | 0.8 | 0.5-3.5 |
| Alconox | 1.0 | 11 | 0.7 | 0.4 | 0.3-1.4 |
| Alconox | 2.0 | 22 | 0.14 | 0.35 | 0.3-0.6 |
| Tip Top Cleaner | 0.7 | 7.8 | 0.49 | 0.5 | 0.3-1.2 |
| Tip Top Cleaner | 2.0 | 22 | 1.4 | 0.3 | 0.2-0.5 |
| Lanolin/Carnauba 50/50 | 0.1 | 7.8 | 0.07 | 0.5 | 0.3-1.0 |
| Lanolin/Carnauba 50/50 | 0.2 | 2.2 | 0.14 | 0.5 | 0.3-1.0 |

Sc = fiber surfacelayer thickness=[(1-f)d/4f]Co]

S = substrate film thickness =[(1-f)c/5f]Co, assuming debris of diameter dw-1 [micrometer] and thickness hw=0.4dw.

Not tested in brushes, but rule out as

| Material | Class | Results |
|---|---|---|
| Polyethylene Glycol (PEG) | Water soluble wax | Material attached water which cause wax to "melt out" of a brush that was full embedded |
| Lithium Grease | Grease | Thickener not soluble, separates out |
| Lithium/Calcium (Marine) Grease | Grease | Thickener not soluble, separates out |

Not included in data above

| Material | Best Conc. (gm100mL solvent) | Film. Thickness | Ave Layer. Thickness | Avg. Coeff. Friction per brush | Friction Range per brush |
|---|---|---|---|---|---|
| Petroleum Jelly | 0.6 | | | 0.6 | 0.15-1.0 |
| Petroleum Jelly | 1.2 | | | 0.6 | 0.2-1.0 |

We also have some data with Lanolin in Ag brushes on Cu rotors

*FIG. 7A*

| Avg File Resistivity (+/-) | Film Resistivity Range (+) | Film Resistivity Range (-) | Wear Rate (+/-) | Sensitive to Temperature ? | Solvent |
|---|---|---|---|---|---|
| 2.0/3.0 | 0.7-4.5 | 1.0-7.0 | $1x10^{-10}/2x10^{-11}$ | No Data | naphtha |
| 3.0/4.0 | 1.5-5.0 | 1.5-4.5 | $7x10^{-10}/1x10^{-11}$ | No Data | naphtha |
| 1.5/3.0 | 0.6-3.5 | 1.0-6.5 | $2x10^{-10}/8x10^{-11}$ | No Data | naphtha |
| 9.0/3.0 | 5.0-15.0 | 2.5-7.0 | $?(\sim 10^{-10})$ | No Data | naphtha |
| 2.5/3.5 | 1.5-3.0 | 2.5-6.5 | $\sim 2x10^{-10}/ 2x10^{-12}$ | No Data | naphtha |
| 3.0/4.0 | 1.8-4.0 | 1.8-7.0 | $?(\sim 10^{-11})$ | No Data | naphtha |
| 1.5/3.0 | 0.5-2.0 | 1.0-4.0 | $5x10^{-11}/5x10^{-12}$ | No | naphtha |
| 5.0/6.0 | 3.0-8.0 | 3.0-13.0 | Not Enough Data | No Data | naphtha |
| 2.0/No Data | 0.8-3.0 | No Data | Not Enough Data | No Data | naphtha |
| 3.0/4.0 | 1.0-8.0 | 1.0-7.0 | $3x10^{-11}/3x10$ | No | naphtha |
| 2.0/3.0 | 1.5-7.0 | 1.0-8.0 | $2x10^{-11}/5x10^{-12}$ | No | naphtha |
| 1.5/3.0 | 1.0-8.0 | 1.0-10.0 | $2x10^{-11}/5x10^{-12}$ | No | naphtha |
| 9.5/No Data | 5.0-11.0 | No Data | Not Enough Data | No Data | naphtha |
| No Data/7.0 | No Data | 5.0-10.0 | Not Enough Data | No Data | naphtha |
| 1.0/No Data | 0.5-2.5 | No Data | Not Enough Data | No Data | water |
| 3.3/5.0 | 2.0-4.0 | 3.0-10.0 | $1x10^{-11}/1x10^{-12}$ | No | water |
| 2.8/5.5 | 1.5-3.0 | 2.0-7.0 | $7x10^{-11}/1x10^{-12}$ | No | water |
| 2.0/4.0 | 1.0-3.0 | 2.0-8.0 | $3x10^{-10}/1x10^{-10}$ | No | water |
| 2.0/3.0 | 1.0-2.6 | 1.0-5.0 | $5x10^{-11}/4x10^{-11}$ | No | water |
| 1.5/3.5 | 0.6-4.0 | 1.5-7.0 | $8x10^{-11}/6x10^{-12}$ | No | naphtha |
| 1.5/2.5 | 1.2-3.0 | 1.5-5.0 | $9x10^{-11}/5x10^{-12}$ | No | naphtha |

| Avg Film Resistivity (+/-) | Film Resistivity Range (+) | Film Resistivity Range (-) | Wear Rate (+/-) | Sensitive to Temperature ? | Solvent |
|---|---|---|---|---|---|
| 4.0/8.0 | 1.5-10.0 | 5.0-11.0 | $8x10^{-10}/2x10^{-10}$ | No Data | naphtha |
| 8.0/8.0 | 3.5-18.2 | 4.5-19.0 | $5x10^{-10}/6x10^{-10}$ | No Data | naphtha |

*FIG. 7B*

| Material Class | Test ID | Problem |
|---|---|---|
| Natural (plant) wax | T#120030612 | |
| Natural (plant) wax | T#120030610 | arced |
| Petroleum wax | T#420030620 | high friction |
| Petroleum wax | T#420030619 | arced |
| Petroleum wax | T#420030609 | arced |
| Petroleum wax | T#420030602 | arced |
| Petroleum wax | T#120030509 | |
| Petroleum wax | T#120030508 | arcing |
| Natural (animal) wax | T#120030307CW, T#120030310CW | |
| Natural (animal) wax | T#120030311CW, T#120030311CW, T#120030313CW, T#120030314CW | |
| Natural (animal) wax | Subtest#220030403 | |
| Natural (animal) wax | Subtest#220030403 | |
| Natural (animal) wax | T#120030311CW | arcing |
| Natural (animal) wax | T#120030307CW | arced |
| Detergent (anionic) | T#1200300908 | high friction |
| Detergent (anionic) | T#420030908, T#420030911 | |
| Detergent (anionic) | T#420030911 | |
| Surfactant (non-ionic) | T#120031002 | |
| Surfactant (non-ionic) | T#120031002 | |
| Natural wax | T#420030709 | |
| Natural wax | T#420040627, T#120030825 | |

| Material Class | Test ID | Reason for not being included | |
|---|---|---|---|
| Petroleum wax | T#420030429 | Cu Rotor | arcing, high wear |
| Petroleum wax | T#120030501 | Cu Rotor | arcing, high wear |

*FIG. 7C*

METAL FIBER BRUSH INTERFACE CONDITIONING

CROSS-REFERENCE TO RELATED APPLICATIONS

This invention relates to electrical brushes, and in particular, to improvements in the design and manufacture of fiber brushes of the type disclosed in commonly owned U.S. Pat. Nos. 4,358,699, 4,415,635, 6,245,440, and 6,800,981 the disclosures of which are incorporated by reference herein. This invention claims priority under 35 U.S.C. § 119(e) to U.S. Patent Application Ser. No. 60/532,921, filed Dec. 30, 2003, entitled METAL FIBER BRUSH INTERFACE CONDITIONING, the entire contents of which is incorporated herein by reference.

BACKGROUND OF INVENTION

1. Field of Invention

The present invention relates to an electrical brush that conducts electrical currents across interfaces between two electrically conducting members in relative motion to one of which the brush is rigidly mechanically connected and the other of which is called the substrate. The electrical brush can be of monolithic type, including a solid piece of graphite or a metal-graphite mixture, or can be a metal fiber brush that is substantially composed of conductive fibers that occupy a "packing fraction", f, of typically about 15% of the fibrous part of a fiber brush, with the remaining volume fraction of (1-f) being voidage, which arrangement permits individual flexibility for the average conductive fibers.

2. Discussion of the Related Art

Sliding of an electrical brush for an extended period or distance on a substrate, while it conducts an electrical current across the interface between the brush and the substrate, requires the presence of a thin interfacial film that typically adheres both conductive members, i.e. to at least a part of the brush and to the substrate. This interfacial film is needed to prevent cold-welding between the brush and the substrate that would cause very high friction and very high wear rates. Further, in the only mode of operation previously known, according to the theory presented in, for example, "Metal Fiber Brushes" by D. Kuhlmann-Wilsdorf, Chapter 20 in "Electrical Contacts: Principles and Applications" (Ed. P. G. Slade, Marcel Dekker, NY, 1999, pp. 943-1017), load-bearing indirect (i.e. via the interfacial film) mechanical contact between an electrical brush and a substrate is restricted to "contact spots" that occupy only a very small fraction of the footprint of the average conductive member and even less (i.e. by the factor of f) of the macroscopic foot print of the brush on the substrate, the footprint being the macroscopic area of the substrate that is covered by the sliding area of the brush, respectively of the sliding conductive brush element.

As already indicated, load-bearing contact between brushes and substrate was, according to the best previous scientific understanding of metal fiber brushes, made via contact spots that normally were formed by surface asperities, typically one or a very few asperities on the average fiber tip that contact the substrate. According to previous usage and best understanding, virtually all of the current flowed through those contact spots, virtually all of the electrical resistance was concentrated at the contact spots, and virtually all friction and wear originated at the contact spots. Following eq.20.45 of the already cited chapter 20 in "Electrical Contacts", for a metal fiber brush of footprint area $A_B$, the total contact spot area through which the brush current flowed in the indicated previously only known mode of metal fiber brush operation, was $$A_C \approx 3\times10^{-4}\beta^{2/3} f A_B \tag{1a}$$

wherein β is the fraction that the macroscopically applied mechanical brush pressure represents of that brush pressure at which the average contact spot is still elastically deformed but above which it is deformed plastically.

For satisfactory brush operation without unduly fast mechanical wear, in the mode of current conduction with contact spots, β is typically chosen between 0.3 and 0.5, but it may be as low as β=0.1 for conditioned brushes according to the present invention. Correspondingly, with f=15%, the area $A_C$ of current conduction at the interface, namely through contact spots, accounts for only $$2\times10^{-5} <\sim A_C/A_B <\sim 2.8\times10^{-5}, \text{ i.e. } A_C \cong 2.5\times10^{-5} A_B \tag{1b}$$

of the macroscopic brush footprint area, $A_B$, in the previously only known mode of metal fiber brush operation.

According to accepted previous theory, the above is true also for monolithic brushes, except that (i) for these monolithic brushes $$A_C \approx 3\times10^{-4} A_B \tag{1c}$$

since β=1 and f=1, (ii) the monolithic brushes include only one electrically conductive member and (iii) the typical number of contact spots of monolithic brushes is on the order of ten as compared to about one contact spot per fiber end, i.e., many thousands for metal fiber brushes. Further, in the course of sliding and incidentally mechanically wearing, monolithic brushes deposit a thin, electrically conductive graphitic surface film on the substrate that is apparently composed of consolidated wear debris. Ordinarily, the relative motion between a monolithic brush and a substrate takes place in that graphitic surface film, wherein graphite serves as a lubricant.

Since metal fiber brushes do not contain graphite, metal fiber brushes do not form a graphitic surface film on the substrate. The properties of the typical insulating surface film at the interface between normally operating metal fiber brushes and their substrates that prevent cold-welding, have been extensively discussed in U.S. Pat. Nos. 4,358,699, 4,415,635, and 6,245,440 as well as in the already cited "Metal Fiber Brushes" by D. Kuhlmann-Wilsdorf, Chapter 20 in "Electrical Contacts: Principles and Applications" (Ed. P. G. Slade, Marcel Dekker, NY, 1999, pp. 943-1017), the entire contents of which is incorporated by reference herein, and several scientific publications referenced in these.

Therein, it has been explained that, to date, the almost exclusively-used surface film to prevent cold-welding of metal fiber brushes is simply adsorbed water that, fortuitously, in our surroundings and in humidified protective atmospheres, establishes itself automatically. This is also a very prevalent surface film that overlays the already discussed graphitic film and is present during operation of monolithic graphitic brushes, as the lubricating property of graphite depends on the presence of adsorbed moisture without which graphite can become abrasive Moreover, in the previously only known mode of operation, at the contact spots in the interface between the substrate and metal fiber brushes as well as monolithic brushes, under normal operating conditions, the adsorbed moisture film squeezes out into a double mono-molecular layer of adsorbed water, one on each side, of a total thickness≅5 Å=0.5 nm. Normal operating conditions of metal fiber brushes involve, for example, brush pressures in the order of $p_B=10^4$ N/m$^2$ and speeds below v=100 m/sec, and the relative sliding takes place between the two adsorbed mono-molecular layers with a friction coefficient of $\mu \cong 0.34$. Brush pressures for monolithic graphite or metal graphite brushes are typically rather higher and, for these pressures, relative sliding takes place mostly in a thicker layer of consolidated wear debris that is overlaid with the same adsorbed moisture film but is more shearable, for example at $\mu \cong 0.2$, than the moisture film. However, on account of the greater mechanical stiffness of the monolithic brushes, the monolithic brushes do not slide successfully at velocities above, for example, 40 m/sec.

When metal fiber brushes are operated in an adequately humid atmosphere, e.g. the open air under most conditions or when the metal fiber brushes are operated in a technologically widely favored protective atmosphere of moist $CO_2$, the interfacial film that separates the brush from the substrate and that prevents cold-welding is essentially the described double mono-molecular film of adsorbed water. It typically has a film resistivity of $\sigma_F \cong 10^{-12}\ \Omega m^2$ within a factor of two or so, and a friction coefficient of $\mu \cong 0.35$ for sliding between the two layers already indicated. Various disturbances, presumably foremost among these adsorbed oxygen that competes with the adsorption of water molecules, may raise those values to between $\mu \cong 0.4$ and 0.6 and $\sigma_F \cong 3\times10^{-12}\ \Omega m^2$ within a factor of two or so, provided that the interface is free of disturbing insulating surface films, foremost among these surface films being oxide films, that can drastically raise $\sigma_F$ and can change friction in either direction. Therefore, operation in the open atmosphere, so as to eliminate unacceptably thick insulating surface films, may require protecting the substrate surface by use of noble metals, e.g. applied in the form of a noble metal plating.

Commercial monolithic brushes sliding on copper or copper alloys typically do not employ special measures to protect the substrate from oxidation because the graphitic film that is deposited offers adequate protection. On the down-side, often the presence of a well-seasoned graphitic layer is needed for proper functioning of commercial monolithic brushes, and as it happens, such layers have a tendency to deteriorate in periods of rest and under any number of other influences. As a result, monolithic brushes may perform erratically and pose problems in high-tech applications, e.g. in the main motor-generator of submarines. Further, and in line with the preceding explanation, also monolithic brushes, unless specially formulated, require adsorbed moisture. This is for the reason that graphite is a layer-type crystal whose shearability depends on the presence of water and which in dry conditions is brittle and abrasive.

SUMMARY OF THE INVENTION

Accordingly, one object of the present invention is to provide a novel method of metal fiber brush operation wherein current does not preferentially flow through contact spots at the interface between a current-carrying brush and a conductive substrate whose contact area $A_c$ between the brush and the substrate encompasses $A_C/A_B<\sim2.5\times10^{-5}$ of the area $A_B$ of a brush footprint that is separated by about $S_o \cong 0.5$ nm thick layers of adsorbed humidity, but rather the current flows through much larger fractions $A_C/A_B$, albeit through interfacial films of a conditioning material of a significantly larger average thickness $S_i$ than $S_o$ and of correspondingly higher specific film resistivities than a double-monomolecular layer of adsorbed water. In fact at minimum $S_i$ could consist of only two molecular layers, but due to the larger molecules of the conditioning materials, $S_i$ could only be slightly smaller than 1 nm.

A further object of the present invention is to address problems associated with the prior art method of operating electrical metal fiber brushes as well as making the same.

A further object of the present invention is to reduce the need for adsorbed moisture in the successful operation of electrical metal fiber brushes.

A further object of the present invention is to diminish or eliminate the role of adsorbed moisture in the operation of electrical metal fiber brushes.

A further object of the present invention is to permit operation of metal fiber brushes within their normal temperature range, independent of ambient humidity, so that incidents of cold-welding (at great increase of friction and reduction of brush wear life) are greatly reduced if not eliminated, e.g. permitting operation in deserts, in high-flying air craft, in air-conditioned spaces, and in dry winter conditions where humidity is not abundant.

A further object of the present invention is to permit electric brush operation in an expanded temperature range, which heretofore even in humidified protective atmospheres was restricted to between about 5° C. and somewhere about 80° C., as the ambient water content is typically too low at the low temperature end, and the adsorbed moisture is too weakly bonded and rapidly desorbed at the upper temperature end.

A further object of the present invention is to increase achievable brush current densities and/or sliding speeds where previously these densities and sliding speeds were limited by rising "flash temperatures" as described in *Metal Fiber Brushes* by D. Kuhlmann-Wilsdorf, Chapter 20 in "Electrical Contacts: Principles and Applications" (Ed. P. G. Slade, Marcel Dekker, NY, 1999, pp. 943-1017).

A further object of the present invention is to achieve lower wear rates and thus, at given conditions, increased brush life times by reducing, if not eliminating, the statistical incidences of wear particle formation at contact spots.

A further object of the present invention is to reduce or eliminate polarity effects of brushes, i.e. effects in which typically the positive brush has a smaller film resistivity but a higher wear rate than the negative brush, due to differences in oxidation rates of the substrate under positive and negative biases.

A further object of the present invention is to inhibit oxidation or corrosion attack of the brushes and the substrate.

Various of these and other objects are provided in one aspect of the present invention in which there is provided an electrical brush having at least one conductive element and at least one conditioning material coated on the at least one conductive element. The at least one conditioning material includes at least one of a lanoline compound, a triazole compound, and a scotchguard compound.

According to one aspect of the present invention, there is provided an electrical brush, including at least one conductive element; and at least one conditioning material coated on the at least one conductive element and has a thickness in a range of from $S_C$=0.01 μm to 15 μm. The conditioning material has a composition such that, as deposited on a moving contact surface in the course of brush operation, the conditioning material has an average film thickness on the contact surface of S from several atomic layers to 1 μm, so that current is conducted over a fractional area $f_C$, where $0.01 \leqq f_C \leqq 1$, of a foot print of the conductive element in a current conductive area in which the film thickness $S_i$ is 1.5 nm$\leqq S_i \leqq$12 nm thick.

This is in contrast to prior functional metal fiber brushes operating with contact spots, for which the average thickness of adsorbed moisture outside of contact spots can attain macroscopic proportions and the average layer thickness $S_i$ between the two sides of a contact spot, i.e. at minimum a double monomolecular layer of adsorbed water, is ~0.5 nm$\leqq S_i \leqq$~1.5 nm (compare FIG. 20.4 of Kuhlmann-Wilsdorf, Chapter 20 in "Electrical Contacts: Principles and Applications)

According to another aspect of the present invention, there is provided an electrical brush, including at least one conductive element; and at least one conditioning material coated on the at least one conductive element with a thickness $S_C$ on the conductive element in a range of from 0.05 μm$\leqq S_C \leqq$10 μm, the conditioning material having a composition and being deposited in a manner such as to eliminate contact spots.

According to still another aspect of the present invention, there is provided an electrical brush, including at least one conductive element; and at least one conditioning material coated on the at least one conductive element with a thickness $S_C$ on the conductive element in a range of from 0.07 μm$\leqq S_C \leqq$5.6 μm, the conditioning material having a composition such that, when the brush slides on a contact surface, the conditioning material is deposited with an average film thickness S of from several molecular layers to 0.3 μm, so that current is conducted over a fractional area $f_C$, where $0.01 \leqq f_C \leqq 1$, of a foot print of the at least one conductive element in a current conductive area in which the film thickness $S_i$ ranges from 1.5 nm to 10 nm.

According to another aspect of the present invention, there is provided an electrical brush, wherein the at least one conductive element includes plural conductive fibers and the conditioning material is coated on the conductive fibers with an average thickness $S_C$ of 0.05 μm$\leqq S_C \leqq$10 μm, the conditioning material having a composition that when the brush slides on a contact surface of a conductive substrate, the conditioning material is deposited with an average film thickness on the contact surface S that is less than 100 nm; such that the current is conducted over a fractional area $f_C$ of $0.03 \leqq f_C \leqq 0.5$ of respective foot prints of the fibers; and thicknesses $S_i$ of the conditioning material between the plural conductive fibers and the substrate ranges from 2 nm to 5 nm.

According to another aspect of the present invention, there is provided a method of making an electrical fiber brush having a plurality of fibers including at least one conductive element. The method includes dissolving a conditioning material in a solvent to form a coating solution; infiltrating voids between the plurality of fibers with the coating solution; and removing the solvent so as to leave a coating of the conditioning material having a thickness $S_C$ on the fibers in a range from 0.05 μm to 10 μm. The conditioning material having a composition such that, when the brush slides and thereby wears on a contact surface of a conductive substrate, the conditioning material is deposited with an average film thickness S on the substrate from several atomic layers of the conditioning material to 1 μm so that current is conducted over a fractional area $f_C$ where $0.01 \leqq f_C \leqq 1$ of respective foot prints of the fibers in a current conductive area in which the film thickness $S_i$ ranges from 1.5 nm to 10 nm.

According to another aspect of the present invention, there is provided an electrical brush and method of making, wherein the conditioning material comprises at least one material selected from the group consisting of a wax, oil, soap, detergent, antioxidant, corrosion inhibitor, silicone, vaseline, lanoline, wetting agent, glass cleaner, metal cleaner, metal polish, car polish, car cleaner, car wax, dish washer soap, hair spray, and isolated natural wax.

According to another aspect of the present invention, there is provided an electrical interface, including an electrical fiber brush in electrical contact with a conductive substrate, wherein the brush includes a plurality of conductive fibers; and the substrate includes a conditioning material deposited on a surface of the substrate having an average thickness S ranging from 1.5 nm to 0.3 μm.

According to another aspect of the present invention, there is provided an electrical interface, including a moving contact surface of a conductive substrate; and an electrical fiber brush in electrical contact with the moving contact surface, the brush including a plurality of conductive fibers and a conditioning material coated on the plurality of conductive fibers with a thickness $S_C$ in a range of from 0.05 μm to 10 μm, the conditioning material having an average film thickness S on the moving contact surface over which the brush slides from several atomic layers of the conditioning material to 0.5 μm, and having a composition so that current is conducted over a fractional area $f_C$, where $0.01 \leqq f_C \leqq 1$, of respective foot prints of the conductive fibers in a current conductive area in which the film thickness $S_i$ of the conditioning material at an interface between the conductive fibers and the substrate ranges from 1.5 nm to 10 μm.

According to another aspect of the present invention, there is provided a method of making an electrical interface, including electrically contacting an electrical fiber brush having fibers to a conductive substrate, the fibers impregnated with a conditioning material to a moving contact surface of the substrate; transferring the conditioning material from the electrical fiber brush to the substrate to form a thickness S of the conditioning material on the substrate ranging from 1.5 nm to 1 μm; and conducting current over a fractional area $f_C$, where $0.01 \leqq f_C \leqq 1$, of respective foot prints of the fibers in current conductive areas in which a film thickness $S_i$ of the conditioning material at an interface between the conductive fibers and the substrate ranges from 1.5 nm to 10 nm.

According to another aspect of the present invention, there is provided an electrical brush including at least one conductive element having an end configured to electrically conduct current across an interfacial region between the at least one conductive element and a moving contact surface. At least one conditioning material is coated on the at least one conductive element.

It is to be understood that both the foregoing general description of the invention and the following detailed description are exemplary, but are not restrictive of the invention.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein:

FIGS. 7A, 7B, and 7C present a table, according to the present invention, listing a number of illustrative conditioning substances and solvents;

DETAILED DESCRIPTION OF THE PREFERRED EMBODIMENTS

Figure 1:
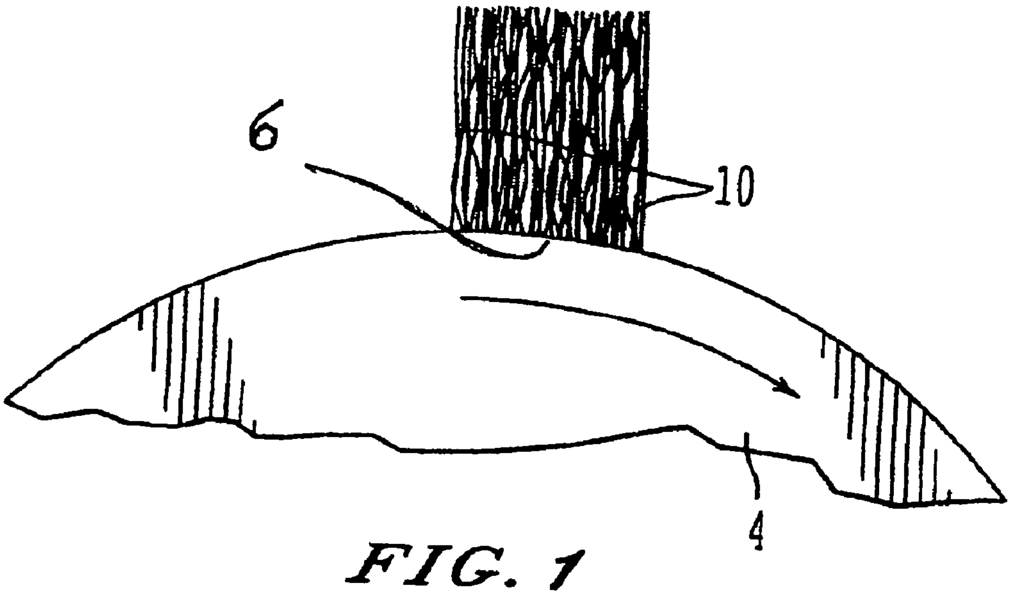
FIG. 1 is a side view illustrating a fiber brush containing plural conductive elements and in sliding contact with a conductive substrate.

The discussed dependence on the presence of adsorbed moisture of electrical brush operation without cold-welding and the resulting prohibitively high friction and wear if cold welding occurs poses a problem especially when for some reason or the other adsorbed moisture is lacking, e.g. as at high altitudes, in desert conditions, at arctic temperatures, or above about 80° C. Hitherto the only remedy for metal fiber brushes in such conditions was to provide a protective, humidified atmosphere, such as moist $CO_2$ already mentioned, necessitating the corresponding enclosures and controls.

The present invention discloses an alternative mode of electric brush operation that does not involve contact spots and also does not depend on the discussed special role of adsorbed water for providing the typical interfacial film, and a method to cause that alternative mode of electric brush operation. According to the present invention, that method utilizes a non-metallic coating on the at least one conductive member, normally the fiber surfaces inside of the fibrous part of a metal fiber brush. Previously, coatings on surfaces of fibers inside of metal fiber brushes have been used in at least two instances, but with very different means and objectives.

The first instance is the use of colloidal graphite that was disclosed in the cited U.S. Pat. No. 6,245,440, Colloidal graphite on interior metal fiber surfaces is believed to decrease the friction between fibers in the fibrous part of the brush body, i.e. to serve as an internal lubricant, and thereby to macroscopically soften the fibrous part of a brush. Additionally, hitherto, for metal fiber brushes in the mode of operating with contact spots, the combination of silver fibers and gold- or gold alloy plating on the substrate has been found to be satisfactory ("Metal Fiber Brushes" by D. Kuhlmann-Wilsdorf, Chapter 20 in "Electrical Contacts: Principles and Applications" (Ed. P. G. Slade, Marcel Dekker, NY, 1999, pp. 943-1017)), but efforts are in progress to eliminate the need for gold plating. For this combination in particular the friction coefficient can rise after some period of initially satisfactory sliding and cause high wear. Colloidal graphite that partially fills the interior voids of metal fiber brushes, has been found helpful in preventing such a rise of friction coefficients well above the indicated values, especially between silver fibers and the thin silver "transfer films" that electrically positive brushes (i.e. relative to the substrate) tend to deposit on gold plated substrates in the course of long-term operation. The cause of this effect is believed to be the incorporation of colloidal graphite into the silver transfer film that may prevent local cold-welding with the silver fiber ends, while the relatively weak bonding between adsorbed water and silver surfaces may not provide sufficient protection against such cold-welding. By contrast, negative brushes tend to cause oxidation of the substrate and thereby form a surface film of gradually increasing electrical resistivity unless the interface is protected by a noble metal plating.

Another instance was disclosed by P. K. Lee, in U.S. Pat. No. 4,267,476 of May 12, 1981. Lee plated metal fibers in metal fiber brushes with mixtures of metals and lubricants in order to improve wear rates. However, at the time of this patent, the mode of operation of metal fiber brushes was unknown, and the Lee did not aim to change it, nor to best present understanding will his method have had this effect.

In both of the above cases, therefore, the patented aspect was introduction of a lubricant into metal fiber brushes for the purpose of reducing friction and wear, without any regard to the mode of brush operation or the effect of adsorbed water thereon. By contrast, the present invention concerns not lubrication but conditioning for fundamentally changing the mode of operation of primarily metal fiber brushes, which method can in certain circumstances also be used for monolithic brushes.

Besides the already indicated use of colloidal graphite and fiber platings consisting of metal lubricant mixtures for reducing or increasing mechanical brush compliance, i.e. the reversible length changes of the brush normal to the substrate resulting from applying a brush pressure and for preventing high friction coefficients between silver fibers and gold plating according to Kuhlmann-Wisldorf et al., U.S. Pat. No. 6,245,440, and decreasing friction and wear between fibers and substrates according to Lee, U.S. Pat. No. 4,267,476, no instances of coating fibers in metal fiber brushes have been found in the prior art. However, U.S. Pat. No. 6,245,440 discloses that a substance performing those tasks is not to be applied to the surface of the substrate, neither that it performs any function of changing the mode of brush operation. Correspondingly, the present inventor has found herewith that those inventions are moot in regard to the present invention.

Namely, the present invention introduces a new, previously unknown mode of metal fiber brush operation, that also appears to be achievable with monolithic brushes, wherein the electrical current is conducted through much larger fractions of the brush footprint than in the previously only known mode of brush operation, i.e. via current conduction through contact spots. In this new mode, the actually current conducting area for a metal fiber brush is $$A_C = f_C f A_B \quad (1d)$$

with, say, $0.05 < f_c < 1$ the fraction of the footprint of the fibers that from moment to moment does in fact conduct current as compared to the previously cited value of $A_C \approx 3\times10^{-4}\beta^{2/3} f A_B$ (eq. 1a) achievable with contact spots. Thus, conduction without as compared to conduction with contact spots, increases the current conducting area by a factor greater than $\cong f_C f A_B / 2.5\times10^{-5} A_B \approx 5000 f_C$, i.e. potentially up to 5000 times. This increase in conducting area then permits a correspondingly large increase in the electrical resistivity of the interfacial film that is needed to prevent cold-welding at comparable and on occasion even reduced electrical resistance between the brush and the substrate. However, at the same time the coefficient of friction decreases with film thickness but is, in first approximation, proportional to $A_C$, which limits $A_C$.

Figure 4:
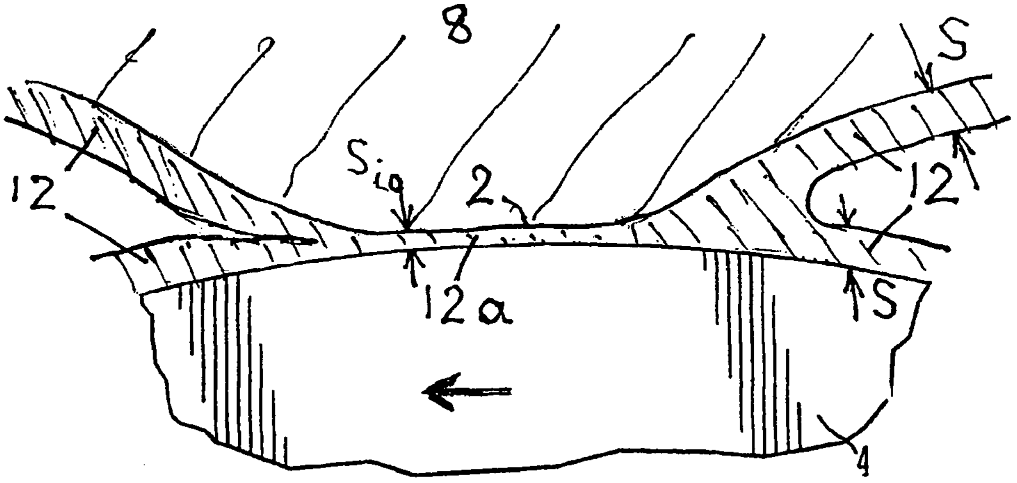
FIG. 4 is a schematic illustration of an expanded side view of a conductive element in contact with a conductive substrate via an adsorbed water layer on both the conductive element and the substrate, wherein the water has been squeezed out to a double monomolecular layer at the contact spot.

Overwhelmingly, without the surface conditioning according to the present invention, the relative displacement between a metal fiber brush and a substrate takes place in the indicated ≅5 Å=0.5 nm thick adsorbed moisture layer at the contact spots, as illustrated in FIG. 4. As a result of the considerable range of layer thicknesses that may be chosen and their effect on film resistivity and friction, metal fiber brush operation with selected conditioning materials that cause the mode of current conduction without contact spots according to the present invention, permit a wide choice of film properties to tailor-make interfacial films with desired properties, e.g. to eliminate the need for adsorbed moisture at the brush/substrate interface, to inhibit oxidation or corrosion attack or to permit eliminating expensive gold plating, but at the same time such wide choice is necessary in order to achieve among others long service life, overcome the indicated restriction in the range of permissible friction coefficients and/or other drawbacks such as perhaps unpleasant odors or appearance.

The actual opportunities and features herein are varied, depending on goals as will be further explained below, backed by a theory that to present knowledge is consistent with available observations. Of particular importance herein is the balance between electrical film resistivity, $\sigma_F$ of the conditioning film, as compared to $\sigma_F=10^{-12}$ $\Omega m^2$ of the "standard" $S_{io}\cong 0.5$ nm thick adsorbed moisture film between contact spots. Namely, by making the film as thin as possible but making $f_C$ large, one will obtain brushes with a desirably low electrical brush resistance but at the expense of increased mechanical friction. Practically speaking, it will be difficult to raise the friction coefficient μ much above, say, 10, and perhaps one will be unable to reach that limit without damage to the brush and/or substrate surface on account of too large tangential forces. Similarly, one cannot arbitrarily raise the electrical brush resistance, as further explained below, without making the brushes non-competitive vis-à-vis alternative brush designs.

Figure 2:
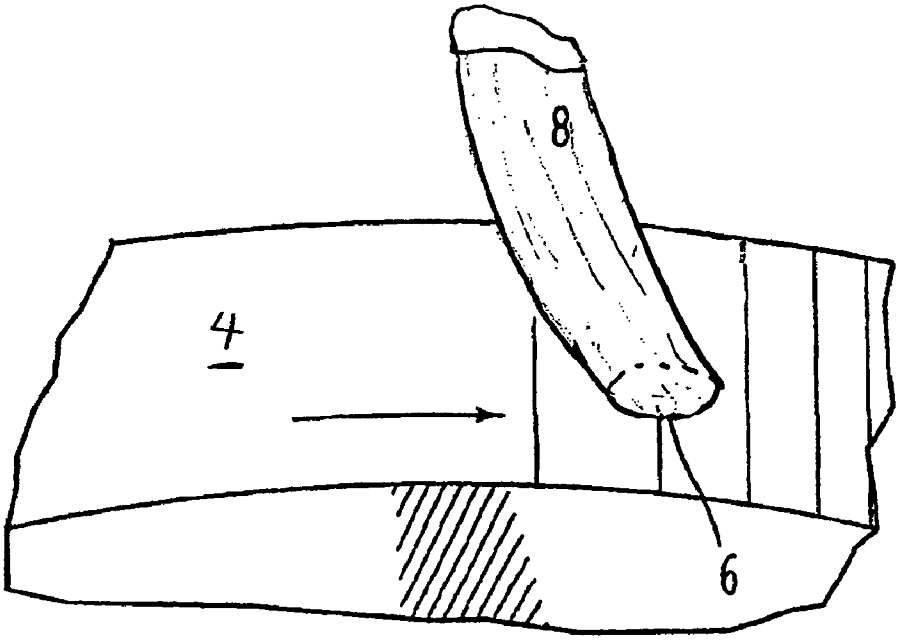
FIG. 2 is a schematic illustration of a conductive element inclined to the substrate surface in the plane normal to the sliding direction

Referring now to the drawings, wherein like reference numerals designate identical, or corresponding parts throughout the several views, and more particularly to FIG. 1, FIG. 1 is a side view illustrating a fiber brush 10 containing plural conductive elements and in sliding contact with a conductive substrate 4. The arrow in FIG. 1 as well as in the following figures represents a direction of motion of the conductive substrate 4 relative to the brush (e.g., the direction of rotation of a rotor in an electric motor). FIG. 2 is a schematic illustration of a singular conductive element 8 of the brush 10 (or alternatively that of a monolithic brush having a singular conductive element). As illustrated in FIG. 2, the conductive element 8 is inclined to the surface of the conductive substrate 4, preferably in a plane normal to the sliding direction. The projected contact area of the end of the conductive element 8 is defined as the footprint 6 of the conductive element onto the substrate 4.

Figure 3:
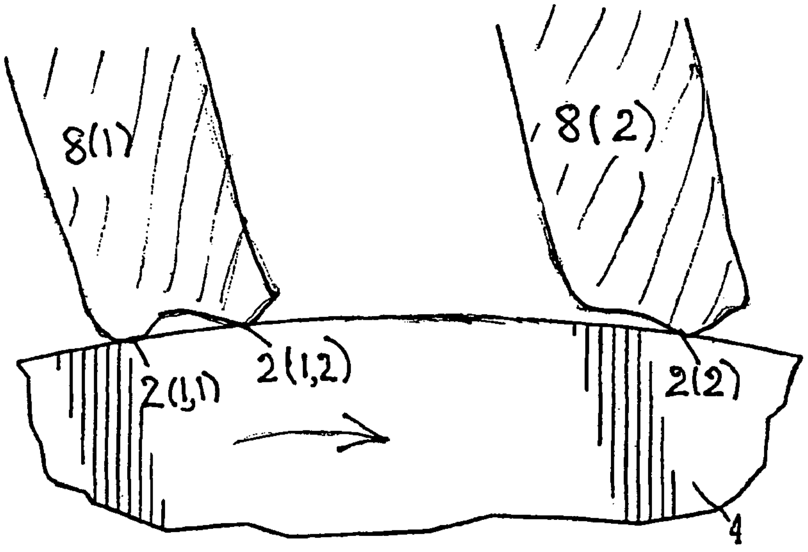
FIG. 3 is a schematic illustration of an expanded side view of two conductive elements in contact with a conductive substrate through contact spots formed by asperities on the ends of the conductive elements.

FIG. 3 is a schematic illustration of an expanded side view of two conductive elements 8(1) and 8(2), e.g. two adjoining fibers in a metal fiber brush, in contact with the substrate 4. As illustrated in FIG. 3, the electrical contact between the conductive elements 8 and the substrate 4 is not made across the area of the footprint, but rather electrical contact occurs through contact spots 2(1,1) and 2(1,2) on the end of the conductive element 8(1) and contact spot 2(2) at the end of conductive element 8(2). In principle, contact spots may also be formed by asperities on the substrate. However, the geometry at the fiber end would not be stable but the asperities would slide over the faces of the fiber ends and the resulting brush wear would tend to be higher. In any event, the contact spots are much smaller than the foot prints of the conductive elements so that the fraction $f_c$ of the footprint carrying electrical current is typically a small fraction of the footprint area, as previously noted.

Further, for brushes 10 and conductive elements 8 operated in a humidity containing environment, as shown in FIG. 4, electrical contact between the conductive element 8 and the substrate 4 occurs via an adsorbed water layer 12 on the conductive substrate 4 as well as on the conductive element. As previously noted, under the strong local pressure at contact spots, the adsorbed water layer is squeezed out except for typically a single mono-molecular layer on each side, i.e. a surface film of $S_{io}\cong 5$ Å=0.5 nm, in FIG. 4 indicated by the number 2. Electrical conduction through such an extremely thin layer occurs by electron tunneling at a very much smaller electrical resistance (called the "electron tunneling resistance") than it would through the same film via ordinary electrical conduction. This is most important because adsorbed water layers, and similarly all other surface films that prevent cold-welding, are electrical insulators, whereas electron tunneling does not depend on the chemical nature of the film but essentially only on the film thickness. Moreover, the electrical tunneling resistance rises extremely steeply with film thickness. As a result even though the average thickness of the adsorbed water elsewhere, shown as "S" in FIG. 4, might be quite small, essentially all of the brush current passes only through the contact spots where the double mono-molecular layers of $S_{io}\cong 5$ Å exist.

The two monomolecular layers of water are much more easily sheared than the materials of the solid substrate 4 and conductive element 8. Therefore the relative displacement between brush and substrate in the course of brush operation takes place in the double-molecular layer 2, which causes a friction coefficient of about 0.35 already mentioned above. The almost ubiquitous presence of adsorbed moisture films in our surroundings, and their almost constant thickness at contact spots and resulting friction coefficient, is in fact the reason why friction is so nearly uniform and reliable in our daily lives, —of which we are vigorously reminded when there is glare ice.

If due to for example vibration, the contact spots 2 were displaced from the substrate by a distance more than the adsorbed water thickness, then locally the electrical brush resistance would rise suddenly and extremely steeply and cause arcing in the air gap, resulting in damage to the conductive element 8 and the substrate 4.

However, water adsorption can not be relied on in many applications where motors are operated, e.g. in low humidity environments as indoors on cold winter days, or in environments absent of humidity such as for example outer space or the upper atmosphere. In any event, even in high humidity, when brushes operate in the contact spot mode, the fraction $f_C$ of the footprint of the conductive element 8 available for current conduction through the adsorbed water layer is a small fraction $f_C$ of the footprint area of the conductive element, and typically much less than 1% of the macroscopic foot print area of a brush.

A noteworthy feature in FIG. 4 is the almost fluid-like behavior of adsorbed water films during sliding. Thus a relatively moving contact spot generates a minor bow wave ahead and leaves a water-depleted trail behind that fills up quickly but not instantaneously, as indicated in FIG. 4.

Figure 5:
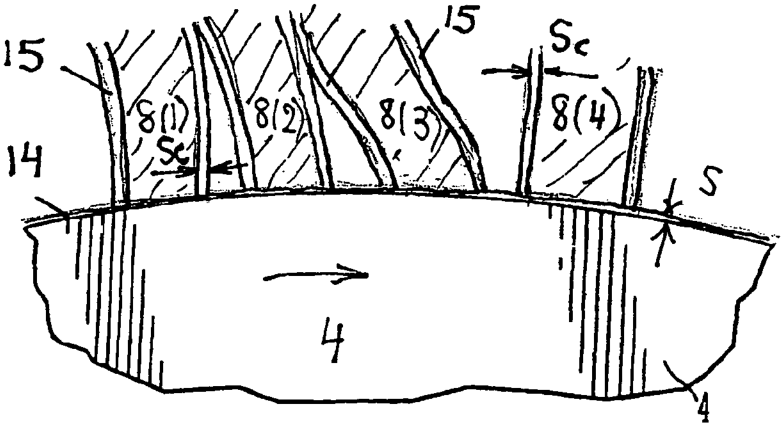
FIG. 5 is a schematic illustration of a conductive elements, according to the present invention, that includes a conditioning film on the conductive elements and transferable to the interface between the end of the conductive elements and the conductive substrate.

FIG. 5 is a schematic illustration of four conductive elements, according to the present invention, that includes conditioning films 15 on the conductive elements 8(1) to 8(4) of an average film thickness $S_c$ and a conditioning film on substrate 4 of average thickness S. The conditioning film 14, is in dynamic equilibrium. It is transferred to substrate 4 from the surface film on the conductive member(s) 15 in the course of brush wear, and is in turn worn away by the sliding ends of conductive members 8, and even more so is carried away by wear debris released from the conductive members. As a result, for successful conditioning materials, film 14 will have an average thickness S that is smaller than the conditioning material film thickness $S_C$ on the conductive member(s) but is larger than $S_{io}$, the double monomolecular moisture layer at contact spots.

Figure 6:
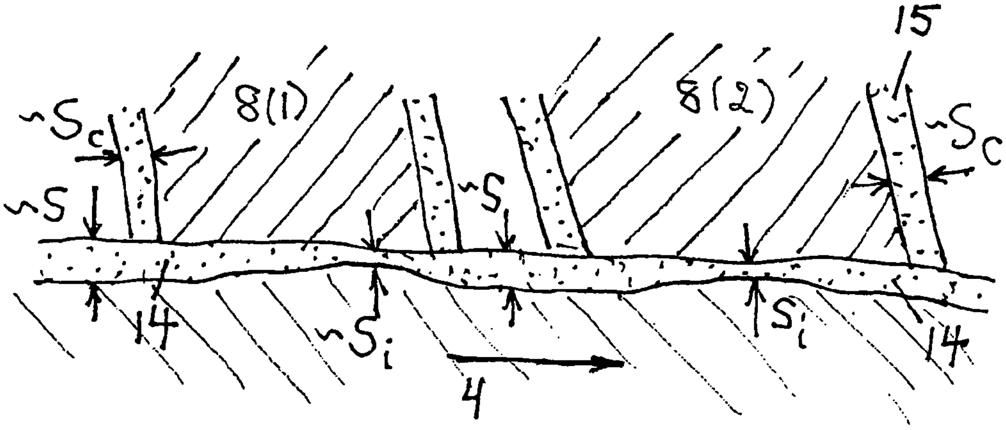
FIG. 6 is a schematic illustration of conductive elements, according to the present invention, showing an enlarged view of FIG. 5.

FIG. 6 illustrates additional features of conditioning film 14. Specifically, a successful conditioning film must cling very tenaciously to the surfaces of conductive members 8 (i.e. 8(1) and 8(2) in FIG. 6), as well as substrate 4, certainly more so than water molecules, and therefore will displace adsorbed moisture. Moreover, even while generally thicker than $S_{io}$, conditioning film 14 will not flow at all as easily as adsorbed water in line with the illustration of FIG. 4. As a result, a successful conditioning film will tend to polish off contact spots, as indicated in both FIGS. 5 and 6. Thus, substrate 4 is covered with a conditioning surface film 14 with average thickness S that may on average be mildly thinner under the footprint of conductive members but with an interface profile free of contact spots.

Through a film 14 as described and illustrated in FIG. 6, current will preferentially flow, via electron tunneling, where the conditioning film 14 happens to be at its thinnest, i.e. of some thickness $S_i$ on average. Therefore, for a successful conditioning film, the total fraction of the footprint area with adequately low thickness $S_i$ for good electron tunneling current density, has to be much larger than the fraction $f_c$ of the footprint area with adsorbed film thickness $S_{io}$ when brushes operate in the contact spot mode. Consequently, overall electrical film resistivity could be reduced compared to the contact spot mode, provided that the conductive surface fraction is quite large, even while the specific tunneling resistance is bound to be higher on account of the greater thickness $S_i$ as compared to $S_{io}$.

Meanwhile macroscopic friction will tend to be increased because relative displacement between conductive element and substrate must, again, i.e. parallel to the case of adsorbed moisture, take place almost exclusively within the conditioning film, 14 and the shearing force required to so shear the conditioning film 14 is proportional to its area and inversely proportional to its thickness. Matters are complicated because of the already discussed intrinsic non-uniformity of the conditioning film thickness, varying between at least S and $S_i$.

The data collected so far and collected in FIG. 7A to C demonstrate that a compromise between the discussed competing considerations is possible. Accordingly, in one embodiment of the present invention, an electrical brush includes at least one conductive element having an end configured to electrically conduct current across an interfacial region (such as the region in FIG. 6 where the conditioning material 14 exists) between the conductive element 8 and an opposing contact surface 4. The conditioning material 14 is coated on the conductive element 8, as shown in FIGS. 5 and 6. The conditioning material is transferred to the interfacial region in the course of brush wear and provides a path for electron conduction through tunneling instead of adsorbed water that fulfills that same function for the case of brush operation with contact spots when moisture is available.

While initially, the making metal fiber brush operation independent of ambient humidity is one object of the present invention, other objects are likewise important, e.g. inhibiting oxidation or corrosion attack, raising the range of brush operating temperatures, increasing the range of brush current densities, lowering the wear rate and, equivalently, increasing brush service life, permitting operation in aggressive environments and still others. All of these and other objects are liable to be achieved with different conditioning materials. Desirable properties of the conditioning materials include unlimited shearability, resistance to temperature changes, tendency to polish off asperities, etc.

All of these and other desirable properties will depend on the conditions of brush operation such as sliding speed, ambient fluid (i.e. possibly liquid as well as gaseous), current density, size and shape of brush, brush pressure PB, brush wear rate, substrate material and substrate properties, including roughness, hardness and/or chemical reactivity, and others apparent from the operating of the brush.

Experimental data so far obtained with the invention are displayed in the Table in FIGS. 7A-7C and their implications are presented by means of some theoretical derivations below. For example, the data in the table show positive results with $S_C$ ranging between 0.07 μm and 0.56 μm on 50 μm diameter fibers with f=15% packing fraction. However, all of these have been obtained with brushes of very similar construction in terms of fiber diameter and packing fraction. It is reasonably expected that on account of variable fiber thickness and packing fraction among the wide range of possibly used brush types, alone, the actual limits of $S_C$ can be as wide as 0.02 $\mu m \leqq S_C \leqq 5.6\ \mu m$. The interfacial most conductive film thicknesses $S_i$ is preferably in a range of $1.5\ nm \leqq S_i \leqq 12\ nm$. Since theoretically $S_C$ is presumed to be approximately proportional to $S_i$, this variance in $S_i$ is apt to further increase the range $S_C$ to $0.01\ \mu m \leqq S_C \leqq 15\ \mu m$. Also, the average film thicknesses S could range between $1.5\ nm \leqq S \leqq 1\ \mu m$.

Besides the application of this invention to metal fiber brushes, the present invention can also be applied in a similar manner to monolithic brushes. Therefore, both metal fiber brushes and monolithic brushes are applicable and included within the scope of the present invention.

Further, the conditioning material, in one embodiment of the present invention, displaces or assumes the role otherwise of adsorbed moisture films so as to make brush performance largely or completely independent of ambient humidity as well as of temperature and/or to condition the interface in some desirable manner, e.g. to lubricate, retard oxidation or corrosion, diminish polarity effects between electrically positive and negative brushes, and/or increase brush wear life.

Additionally, in one embodiment of the present invention, there is provided a method for applying, or adjusting the average thickness S of the conditioning material on the conductive substrate by way of wipers of an absorbent material, such as filter paper or textiles that are impregnated with the conditioning material and that themselves do not ordinarily carry current.

Further included in another embodiment of the present invention is a screening method for an efficient search for successful conditioning film materials based on a number of considerations. Further, in another embodiment of the present invention, the methods disclosed herein are applicable to monolithic brushes (i.e., electrical brushes with just one electrically conductive member) that may be specially prepared and impregnated with conditioning materials.

Unless specifically defined, all technical and scientific terms used herein have the same meaning as commonly understood by a skilled artisan of cosmetology, chemistry, physics and materials science.

The following exemplified insights are gained from the present invention:

1) The range of potential conditioning materials choices is large and the range of thicknesses of the conditioning materials on the conductive elements and the conductive substrate is broad. Ultimately, materials choices and parameters for the present invention will optimally be guided by theory.

2) The material of the desired surface film, which is designed to substitute for adsorbed water molecules, or for a noble metal plating, should be preferably delivered to the interface only as fast as the conditioning material is worn off, since an excess of film material triggers arcing that typically damages the brush as well as the substrate.

3) A conditioning material should preferably polish off, or flatten contact spots and should preferably be laid down in a film that is rather thicker than an adsorbed moisture film between contact spots.

4) In a preferred embodiment of the present invention, the conditioning surface film considerably increases the area through which current flows across the brush-substrate interface than would have occurred through contact spots such as shown in FIG. 4

5) The material of the conditioning film should preferably have at least a preponderance of the following properties, listed in no particular order:

a) Mechanically persistent, i.e. not readily eroded, b) Chemically inert, c) Non-toxic, d) Non-volatile, e) Adherent to the substrate, f) Adherent to the brush material, g) Amenable to incorporation into brushes so as to be transported into the interface in the course of brush wear, h) Hydrophobic (so as not to dissolve under humid or wet conditions), i) Shearable at low shear stresses so as to yield low friction coefficients, j) Not a cause of wear debris to cluster so as to cake fiber ends together, k) Non-corrosive, l) Chemically/thermodynamically stable, m) Mechanically stable, n) Applicable in a wide range of temperatures, optimally from 0 to 100° C., and o) Protect the substrate as well as the brushes from oxidation so as to obviate the need for noble metals or noble metal plating of the brush track.

Additionally, the present invention utilizes, in part, the following novel methods:

1) The brush fibers may be coated with the film conditioning material before assembling the brush fibers into "brush stock" from which subsequently brushes are cut, or indeed even before kinking the fibers from which the brush stock is subsequently made. However, in one preferred embodiment, the film conditioning material can be applied after the brush has been manufactured.

2) In order to obtain a predetermined coating thickness on the fibers, the conditioning material is preferably dissolved in a volatile solvent with which the fibers are wetted and then dried. Alternatively, instead of making a solution, the conditioning material can be incorporated into the brush or brush stock in the form of an emulsion which then is dried as before.

3) In a case that the conditioning material is introduced into an otherwise completed brush, the brush can be soaked with a solution or emulsion of predetermined concentration of from 0.01 to 99.99% conditioning material by weight, preferably from 0.01 to 1 weight percent of conditioning material in the solution or emulsion including all ranges and subranges therebetween.

4) Further, in case of conditioning an otherwise already completed brush, or brush stock, in order to obtain a more or less uniform coating of the fibers, the solvent can be preferably evaporated by mild heat while the brush or brush stock is slowly rotated so as to prevent segregating the solution/material in a restricted part of the brush or brush stock, e.g. near the fiber ends or on one side.

Heating may be done, for example, over an electric heating plate or in an oven at a temperature of, e.g. 40° C. to 150° C., depending on solvent used, and the rotation can be about a horizontal axis that passes through the center of the brush or brush stock, oriented parallel to the average fiber direction, although other orientations are not excluded by the present invention. Useful temperatures for heating are, for example, from 45° C. to the boiling point of the solution but less than the melting point or curing temperature of any of the normal constituents of the brushes, e.g. the melting point or curing temperature of bonding materials between brush and base plate. The rate of rotation should be adapted so as to avoid solution segregation through centrifugal force and speedy enough to both optimize the speed of evaporation and avoid solution segregation through gravity. One revolution per second or slower, depending on brush size, is one suitable range. As such, the solvent concentration exists in the voids of the brush or brush stock initially at the concentration of the solvent in the solution applied containing the conditioning material, and by being heated to an elevated temperature, the concentration of the conditioning material relative to the solvent increases as the solution dries.

A brush may be ready for use after it is thoroughly dry, which may require anywhere from a few minutes to some hours depending on brush size and temperature. Wiping excess bonding material from the footprint of the brush before operating can be useful for preventing initial arcing. Hence, the brush upon being thoroughly dry contains a thoroughly dried conditioning material.

Alternatively, the conditioning material may be introduced into a brush or brush stock from which brushes will be cut by dipping the brush or brush stock into a solution of the conditioning material and draining out excess liquid, followed by drying. Further, a conditioning material may be introduced into a brush or brush stock in the gaseous state, e.g. by exposing it to oil vapor, or drawing a vapor or mist of a conditioning substance through the porous brush material composed of thin metal fibers by way of a pressure gradient, e.g. mild vacuum on one side or conversely a mild excess pressure (e.g., pressures from a few percent above atmospheric pressure to two atmospheres).

Draining of excess liquid may be done by various alternative methods, in addition to or besides the already described drying while rotating the brush or brush stock, such as for example centrifuging, suspending a brush or brush stock to allow liquid to drip out, e.g. in a vertical position, e.g. with the brush running surface facing down, or removing excess fluid by tapping on filter or blotting paper, e.g. with the brush running surface facing down, or one of the sides of brush stock facing down, etc.

If desired, in order to "season" the substrate surface or rotor, i.e. to provide substantially the same surface film that is to be laid down by the brushes already before the start of sliding, the moving substrate or rotor may be wiped at modest finger pressure (e.g., up to a few Pa) with a piece of clean tissue, cloth, paper toweling, filter paper or other, to which a small amount of the solution or of the pure conditioning material has been applied. Weighing of the tissue or other, before and after wiping, will permit to gauge the film thickness applied, by taking into account the substrate or surface area treated, and the concentration of the solution or mechanical density of the pure material, as the case may be.

According to one embodiment of the present invention, the applied initial film to the conductive substrate 4, e.g. a rotor, may be at least up to 100 nm thick and can be up to about 1 μm thick depending on material and other circumstances. Correspondingly, and in accordance with considerations already discussed above, useful average conditioning film thicknesses on the conductive substrate 4 are believed to be 1.5 nm≦S≦1 μm including all ranges and subranges therebetween. Typically conditioning films on substrates will be barely, if at all visible and may weigh as little as 0.01 mg per $cm^2$ or even 0.001 $mg/cm^2$ and less.

Whether or not prior seasoning of the substrate surface with conditioning material, before operating a conditioned brush according to the present invention, is advisable depends on the ratio of $A_B$, the brush area or "brush footprint" on the substrate, relative to the total area of the sliding track of the brush on the substrate. Specifically, $A_B$ is rarely longer than about 5.0 cm in sliding direction, with an area rarely larger than 12 $cm^2$. According to one embodiment of the present invention, prior conditioning will be useful for brush tracks that are more than one hundred times longer than the brush length in a sliding direction.

According to one embodiment of the present invention, the conditioning material adhering to the fiber tips after soaking and drying (typically also so thin as to be invisible) will be sufficient to provide the initial film, and no initial track seasoning may be needed. Indeed, and as already indicated, before the start of running the brushes or after the first few minutes, excess material may have to be removed from the brush face and/or from the track in order to inhibit arcing. Similarly, also the predetermined thickness of the film material on the interior surfaces of the fibers in the brush can be adjusted according to the indicated ratio of $A_B$ to the area of the sliding track, i.e. the distance between brushes on the same track or the sliding length per revolution in the case of only one brush on a track, whichever is the smaller.

Included in Table 1 shown in FIGS. 7A-C are a number of illustrative conditioning substances and solvents. The present inventor has found that, through judicious adjustments of $S_C$ in conjunction with brush pressure and sliding speed, a large range of materials are suitable conditioning materials for the present invention.

Possible solvents suitable for the present invention include for example hydrophilic, hydrophobic, and organic solvents. Illustrative examples of suitable solvents include water, lower alkyl alcohols, ketones, lower alkyl ketones, ethers, acetone, toluene, naphtha, petroleum, ethyl alcohol, methyl alcohol, petroleum distillates, hydrofluorocarbon-based solvents and any other organic volatile solvent. In order to obtain a reproducible surface film, the solvent is preferably of a high chemical purity.

Further suitable solvents can include lower monohydric alcohols and ketones with a carbon chain length from 1 to 22, including from 1 to 10, further including from 1 to 8. These solvents may also possess 1, 2, 3, 4, 5, 6, 7, and/or 8 carbons. Further, the solvent can be an alkoxylated alcohol with a carbon chain length from 2 to 22, especially 2 to 20 carbons. For example, alkoxylated alcohols where the alcohol portion may be selected from aliphatic alcohols having 2 to 18 and more particularly from 4 to 18 carbons, and the alkylene oxide portion may be selected from the group consisting of ethylene oxide, polyoxyethylene, and polyoxypropylene having a number of alkylene units from 2 to 53 (and more particularly from 2 to 15 units) may be especially useful. Particular examples can include Laureth-4 and Isosteareth-21.

The conditioning material, according to one embodiment of the present invention, can be in the form of an emulsion, such as for example an oil in water emulsion.

Table 1 also shows classes of illustrative conditioning materials that include oils, soaps, silicones, waxes, mixtures of any of these, and a host of other organic materials. These conditioning materials can include the following: hydrocarbon oils and waxes such as include mineral oil, petrolatum, paraffin, ceresin, ozokerite, microcrystalline wax, polyethylene, and perhydrosqualene. These conditioning materials can also include the following silicone oils such as dimethyl polysiloxanes, methylphenyl polysiloxanes, water-soluble and alcohol-soluble silicone glycol copolymers. These conditioning materials can also include the following triglyceride esters such as vegetable and animal fats and oils. Examples of such vegetable and animal fats and oils may include castor oil, safflower oil, cotton seed oil, corn oil, olive oil, cod liver oil, almond oil, avocado oil, palm oil, sesame oil, and soybean oil.

Specific oils potentially useful in the present invention may include caprylic triglycerides; capric triglycerides; isostearic triglycerides; adipic triglycerides; wheat germ oil; hydrogenated vegetable oils; petrolatum; branched-chain hydrocarbons; alcohols and esters; castor oil; lanolin oil; corn oil; cottonseed oil; olive oil; palm kernel oil; rapeseed oil; safflower oil; jojoba oil; evening primrose oil; avocado oil; mineral oil; sheabutter; octylpalmitate; maleated soybean oil; glycerol trioctanoate; diisopropyl dimerate; isocetyl citrate; volatile and non-volatile silicone oils which may include dimethicone, phenyl dimethicone, cyclomethicone, poly(perfluoroalkyl)siloxanes, linear and cyclic polyalkyl siloxanes and mixtures thereof. Oils used in the present invention may further include selections from the group consisting of caprylic triglycerides, capric triglycerides, isostearic triglyceride, castor oil, adipic triglyceride, diisopropyl dimerate, dimethicone, octyl dodecanol, oleyl alcohol, hydrogenated vegetable oils, maleated soybean oil, lanolin oil, polybutene, oleyl alcohol; hexadecyl alcohol wheat germ glycerides and mixtures thereof.

In addition, oils useful in the present invention may include emollients, humectants, occlusives and mixtures thereof. Emollients that may be useful in the present invention are found in The C.T.F.A. Cosmetic Ingredient Handbook, pages 572-575, 1992; herein incorporated by reference. The emollients include lanolin, anhydrous lanolin, synthetic lanolin derivatives, modified lanolins, isopropyl palmitate, isononyl isononanoate, isopropyl isostearate, cetyl ricinoleate, octyl palmitate, cetyl ricinoleate, glyceryl trioctanoate, diisopropyl dimerate, propylene glycol, polyglycerol esters, myristyl acetate, isopropyl myristate, diethyl sebacate; diisopropyl adipate; tocopheryl acetate; tocopheryl linoleate; hexadecyl stearate; ethyl lactate; cetyl lactate, cetyl oleate, octyl hydroxystearate; octyl dodecanol, decyl oleate, propylene glycol ricinoleate, isopropyl lanolate, pentaerythrityl tetrastearate, neopentylglycol dicaprylate/dicaprate, hydrogenated cocoglycerides, isotridecyl isononanoate, isononyl isononanoate, myristal myristate, triisocetyl citrate, cetyl alcohol, octyl dodecanol, oleyl alcohol and mixtures therefore. Emollients that may be particularly useful; are selected from the group consisting of lanolin, diisopropyl dimerate, polyglycerol esters, isopropyl isostearate, cetyl lactate, octyl hydroxystearate and mixtures thereof.

Humectants that may be useful in the present invention include those as disclosed in The C.T.F.A. Cosmetic Ingredient Handbook, page 567, 1992; herein incorporated by reference. Occlusives that may be useful in the present invention are likewise found in The C.T.F.A. Cosmetic Ingredient Handbook, at pages 578-580; herein incorporated by reference.

Potentially useful are also volatile silicone fluids may include cyclomethicones having 3, 4 and 5 membered ring structures. The volatile silicones include 244 Fluid, 344 Fluid and 345 Fluid from Dow Corning Corporation.

Other silicone fluids such as those poly(organosiloxane) fluids, suitable for the present invention, are described in U.S. Pat. No. 5,948,394, which is hereby incorporated by reference. Commercially available non-volatile silicone fluids having such non-end groups include those available from Dow Corning as the 200 Fluids, and those available from General Electric as SF-96 Series. Silicone fluids with non-end groups comprising fluoroalkyl groups are also potentially useful herein. Commercially available non-volatile silicone fluids suitable for the present invention include those available from Dow Corning as the 1265 Fluid series, and those available from General Electric such as the SF-1153 Series including the 1265 Fluid Series and those of having a dynamic viscosity from about 100 cSt to about 350 cSt.

Silicone fluids with the non-end groups having allyl groups are also suitable for the present invention. The allyl groups, which may be particularly useful in the present invention, can include phenyl groups. Allyl-substituted silicone fluids suitable for the present invention that are commercially available include those available as the 556 Series from Dow Corning.

Further, poly(organosiloxane) fluids considered for the present invention may be selected from the group consisting of poly(dimethylsiloxane) fluids, poly(phenylmethylsiloxane) fluids, poly(fluoroalkylmethylsiloxane) fluids, and the copolymers of the fluids and mixtures thereof. More preferred fluids are selected from the group consisting of poly(dimethylsiloxane) fluids, and their copolymers and mixtures thereof. Most preferred are poly(dimethylsiloxane) fluids and their copolymers, preferably selected from the group consisting of dimethicone, phenyl dimethicone, phenyl trimethicone and mixtures thereof.

In addition, according to the present invention, the conditioning material can be acetoglyceride esters, such as for example acetylated monoglycerides, ethoxylated glycerides, such as ethoxylated glycerylmonostearate, alkyl esters of fatty acids having 1 to 20 carbon atoms, wherein methyl, isopropyl, and butyl esters of fatty acids may be useful. Examples of alkyl esters suitable for the present invention include hexyl laurate, isohexyl laurate, iso-hexyl palmitate, isopropyl palmitate, decyl oleate, isodecyl oleate, hexadecyl stearate, decyl stearate, isopropyl isostearate, diisopropyl adipate, dissohexyl adipate, di-hexyldecyl adipate, diisopropyl sebacate, lauryl lactate, myristyl lactate, and cetyl lactate. Also suitable for the conditioning material of the present invention are alkenyl esters of fatty acids having 1 to 20 carbon atoms. Examples of these alkenyl esters include oleyl myristate, oleyl stearate, and oleyl oleate. Fatty acids having 1 to 20 carbon atoms are also suitable for the conditioning material of the present invention. Suitable examples of such fatty acids include pelargonic, lauric, myristic, palmitic, stearic, isostearic, hydroxystearic, oleic, linoleic, ricinoleic, arachidic, behenic, and erucic acids.

Fatty alcohols can be suitable for the conditioning material of the present invention such as for example those having 1 to 20 carbon atoms. Lauryl, myristyl, cetyl, hexadecyl, stearyl, isostearyl, hydroxystearyl, oleyl, ricinoleyl, behenyl, and erucyl alcohols, as well as 2-octyl dodecanol, are examples of satisfactory fatty alcohols. Fatty alcohol ethers such as for example ethoxylated fatty alcohols of 1 to 20 carbon atoms including the lauryl, cetyl, stearyl, isostearyl, oelyl, and cholesterol alcohols having attached thereto from 1 to 50 ethylene oxide groups or 1 to 50 propylene oxide groups, can also be suitable for the conditioning material of the present invention. Ether-esters such as fatty acid esters of ethoxylated fatty alcohols may be used as the conditioning material of the present invention.

The conditioning material of the present invention can also be lanolin and its derivatives such as lanolin, anhydrous lanolin, lanolin oil, lanolin wax, lanolin alcohols, lanolin fatty acids, isopropyllanolate, ethoxylated lanolin, ethoxylated lanolin alcohols, ethoxolated cholesterol, propoxylated lanolin alcohols, acetylated lanolin, acetylated lanolin alcohols, lanolin alcohols linoleate, lanolin alcohols recinoleate, acetate of lanolin alcohols recinoleate, acetate of lanolin alcohols recinoleate, acetate of ethoxylated alcohols esters, hydrogenolysis of lanolin, ethoxylated hydrogenated lanolin, ethoxylated sorbitol lanolin, and liquid and semisolid lanolin absorption bases.

The conditioning material of the present invention can also be polyhydric alcohols and polyether derivatives. Propylene glycol, dipropylene glycol, polypropylene glycols 2000 and 4000, polyoxyethylene polyoxypropylene glycols, polyoxypropylene polyoxyethylene glycols, glycerol, sorbitol, ethoxylated sorbitol, hydroxypropylsorbitol, polyethylene glycols 200 to 6000, methoxy polyethylene glycols 350, 550, 750, 2000 and 5000, poly[ethylene oxide] homopolymers (100,000 to 5,000,000), polyalkylene glycols and derivatives, hexylene glycol (2-methyl-2,4-pentanediol), 1,3-butylene glycol, 1,2,6-hexanetriol, ethohexadiol USP (2-ethyl,3-hexanediol), C15-C18 vicinal glycol, and polyoxypropylene derivatives of trimethylolpropane are examples of this group of materials.

The conditioning material of the present invention can also be chosen from among polydydric alcohol esters, including ethylene glycol mono- and di-fatty acid esters, diethylene glycol mono- and di-fatty acid esters, polyethylene glycol (200 to 6000), mono- and di-fatty acid esters, propylene glycol mono- and di-fatty esters, polypropylene glycol 2000 monooleate, polypropylene glycol 2000 monostearate, ethoxylatedpropylene glycol monostearate, glyceryl mono- and di-fatty acid esters, polyglycerol poly-fatty acid esters, ethoxylated glyceryl monostearate, 1,3-butylene glycolmonostearate, 1,3-butylene glycol distearate, polyoxyethylene polyol fatty acid ester, sorbitan fatty acid esters, and polyoxyethylene sorbitan fatty acid esters may be satisfactory polyhydric alcohol esters for use herein.

The conditioning material of the present invention can also be waxes. Suitable waxes can include hydrocarbons or esters of fatty acids and fatty alcohols and are derived from natural, synthetic and mineral sources. Natural waxes can be of animal origin, such as beeswax, spermaceti, lanolin, shellac wax, can be of vegetable origin, e.g. carnauba, candelilla, bayberry, sugarcane wax, or can be of mineral origin, e.g. ozokerite, ceresin, montan, paraffin, microcrystalline wax, petroleum and petrolatum wax.

Synthetic waxes suitable for the present invention can include those disclosed in Warth, Chemistry and Technology of Waxes, Part 2, 1956, Reinhold Publishing; herein incorporated by reference. Such waxes can include long chained polymers of ethylene oxide combined with a dihydric alcohol, namely polyoxyethylene glycol. Such waxes can include carbowax available from Carbide and Carbon Chemicals company. Other synthetic waxes can include long-chained polymers of ethylene with OH or other stop length grouping at end of chain. Such waxes can include the Fischer-Tropsch waxes as disclosed in the text disclosed above at pages 465-469 and include Rosswax, available from Ross company and PT-0602 available from Astor Wax Company.

The waxes may be selected from the group consisting of candelilla, beeswax, beeswax having free fatty acids removed (modified beeswax), carnauba, spermaceti, montan, ozokerite, ceresin, paraffin, bayberry, castor waxes, synthetic waxes, microcrystalline waxes, silicone waxes (modified to be compatible with other first materials) and mixtures thereof. More preferably the waxes may be selected from the group consisting of microcrystalline, spermaceti, candelilla, modified beeswax, carnauba, ozokerite, paraffin, ceresin, silicone waxes, Fischer-Tropsch waxes, carbowaxes and mixtures thereof. Most preferably, the waxes are selected from the group consisting of candelilla, ozokerite, paraffin, carnanuba wax, Fischer-Tropsch waxes and mixtures thereof.

The conditioning material of the present invention can also be phospholipids, such as lecithin and derivatives.

The conditioning material of the present invention can also be sterols such as cholesterol and cholesterol fatty acid esters as examples.

The conditioning material of the present invention can also be amides such as fatty acid amides, ethoxylated fatty acid amides and solid fatty acid alkanolamides.

The conditioning materials may also be anti-oxidants or corrosion inhibitors such as triazoles, e.g. ACC#99358 1H-Benzotriazole and its derivatives.

The conditioning material of the present invention can also be polymeric ethers as for example, polyoxyethylene polyoxypropylene block polymers (for example, Poloxamer 407); polyoxypropylene-3-myristyl ether (Promyristyl PM3); polyalkylene glycol monobutyl ether (UCON lubricant 50 HB 100).

Since the present invention envisages the establishment of an average equilibrium film thickness on the substrate S of between 1.5 nm and 1 μm, more or less, the concentration of the film material relative to the fiber material in the brush, should be suitably adjusted.

While no reliable theory of the mechanical thinning of the conditioning films of the present invention, i.e. between a substrate and metal fiber tips that slide on it, e.g. a metal slip ring or commutator exists, mechanical thinning of the conditioning films is similar to thinning of samples between Bridgman anvils that has been studied in a previous paper (see "Plastic Flow Between Bridgman Anvils Under High Pressure", D. Kuhlmann-Wilsdorf, B. C. Cai and R. B. Nelson, J. of Materials Research, 6, (1991) pp. 2547-2564).

From a practical standpoint, according to the present invention, suitable values of average film thickness on the interior surfaces of the fibers in fiber brushes range between 0.05 $\mu m \leqq S_C \leqq 10\ \mu m$, depending on brush fiber diameter, brush packing fraction f, dimensionless wear rate, desired value of S and of $S_i$, the latter depending among others on the hardness of the brush fiber material and the viscosity of the conditioning material. Together these properties determine to what extent the conditioning material is locally mechanically thinned out in the course of brush operation. Specifically, the present invention has determined that too soft a brush fiber material, in particular soft-annealed silver on gold plate for the case of anhydrous lanolin as conditioning material, may cause a progressive decrease of $S_i$ that sooner or later leads to an unacceptably high value of the friction coefficient between brush and substrate.

Beyond the already discussed facts, the nature of the optimum conditioning film material will depend on the intended use. Indeed the various goals of replacing adsorbed moisture, increasing the useful temperature range of brush operation, reducing the wear rate, reducing the polarity effect, reducing corrosive, chemical or electrochemical attack, acceptably low electrical brush resistance and low friction, are interrelated. Specifically, for the same conditioning material, increased conditioning film thickness tends to lower friction and gives rise to lengthened brush wear life as well as to improved corrosion resistance, while lowered conditioning film thickness promotes higher permissible current densities but also increased friction and probable faster brush wear. Again, larger molecules with chemical side-groups will presumably be associated with larger minimum conditioning film thicknesses and perhaps higher friction coefficients but provide heightened protection against oxidization, while smaller molecules presumably are best adapted to thin films and high achievable current densities, and so on.

Correspondingly, in view of the expected steadily expanding role of metal fiber brushes in future technology, eventually different classes or types of conditioning materials will presumably be developed for different technological tasks, e.g. bursts of intermittent high speed sliding that will require low friction but is permissive of relatively high dimensionless wear rates and even local arcing. By contrast, long lifetimes at high current densities of metal fiber brushes in homopolar machines may permit relatively large friction coefficients, to which the principles detailed in the present invention are applicable although emphasis has been given here on conditioning materials that eliminate the need for humidity control, i.e. for long-term use of metal fiber brushes in deserts, in space, or in the arctic, for example, thereby removing restrictions that similarly adhere also to monolithic brushes.

One aspect of the present invention is a method of non-random search for successful film materials among the possible choices, which are exemplified above, that is based on scientific understanding and will be explained in the next section, after discussing the results already obtained. That method has been developed in tandem with an active search and sample testing, the results of which are summarized in Table 1 (shown in FIGS. 7A-C). Namely, experiments with a variety of candidate materials (such as the window cleaner "TipTop" shown in Table 1) introduced into silver metal fiber brushes sliding on gold plate in the open atmosphere, have indeed identified a majority of the tested materials as successful conditioning materials.

When applied through the metal fiber brushes as outlined, these suitable conditioning materials have according to the present invention (i) induced the mode of current conduction without contact spots and (ii) have at least partly replaced the film of adsorbed humidity and thereby eliminated sensitivity to changes of ambient humidity as well as greatly increased the temperature range of at least short-term effective brush operation, e.g. from between about 5° C. and 80° C. for the untreated interfaces, to between the temperature of liquid nitrogen, i.e. −195.8° C. and up to at least 150° C. in short-term testing. Correspondingly, and subject to confirmation, useful brush operating temperatures according to the present invention can range at a minimum between −190° C. and 150° C.

In accordance with the already listed selection, the range of potential candidate materials for conditioning films that can at least partly replace the otherwise almost ubiquitous adsorbed moisture films is vast, and testing any one requires significant effort. Eventually, the attendant developmental research will amass a wealth of data on the effects on coefficient of friction and wear rate of prominent chemical molecules. Nevertheless as a first useful step, the present invention presents previously unknown theoretical relationships, based on which (1) the search for successful conditioning film materials can be systematized, (2) the range of successful conditioning film thickness S on the substrate can be predicted, and (3) the requisite conditioning material layer thickness $S_C$ of the fibers in the brushes can be predicted.

While not limiting the present invention, the following further discussion explaining the method of prediction serves to illustrate features of the present invention: Surface films between contact spots of unlubricated metal fiber brushes in gaseous surroundings are typically so thin that the surface films conduct current through electron tunneling. One may ask whether this is true also for successful "conditioning films" in accordance with the present invention. The question arises because following eqs. 1a to 1d, conditioning films typically carry current over a much larger surface area than the total contact spot area of metal fiber brushes.

In answering that question, recall from FIGS. 1 to 6 that metal fiber brushes include large numbers of substantially parallel thin metal fibers that typically extend from a stationary metal base plate and whose free ends collectively conform to, and painters-style slide on, some relatively moving metal, herein referred to as the "substrate." Typically but not necessarily, the substrate is a "rotor" of cylindrical shape such as a slip ring or a commutator. An electrical potential, V [Volts], applied between the brush base plate and the rotor, drives a current i [Amps] between the two sides that is conducted through the metal fibers.

It is desired that the described current transfer across the interface between the brush fiber ends and the substrate occurs at as low a "loss" (W [watt]) as possible. The loss W is the sum of the rate of Joule heat evolution, which for current conduction through contact spots is approximately $\sigma_F i^2 A_B (H/p_B)$, and of the rate of mechanical friction heat evolution of $A_B p_B \mu v$.

Herein, $\sigma_F$ is the film resistivity (measured in $\Omega m^2$), $A_B$ is the macroscopic area of the footprint of the brush on the substrate, H is the "Miller" hardness of the fiber material, PB is the average mechanical pressure between brush and substrate, v is the sliding velocity, and $\mu$ is the coefficient of friction.

Keeping the Loss $$W \approx \sigma_F i^2 (H/p_B)/A_B + A_B p_B \mu v \quad (2)$$

(and similarly importantly the brush wear rate) low, would seem to require on the one hand the presence of some typically insulating, surface film without which the two sides would cold-weld at a prohibitively large friction coefficient, $\mu$ . . . . At the same time, a low loss also would seem to require a low value of $\sigma_F$ which means that the surface film must be very thin.

For thin electrically insulating films, electron tunneling is by far more efficient than ionic conduction, as vividly demonstrated in FIG. 20.4 of "Metal Fiber Brushes" by D. Kuhlmann-Wilsdorf, Chapter 20 in "Electrical Contacts: Principles and Applications" (Ed. P. G. Slade, Marcel Dekker, NY, 1999, pp. 943-1017), the entire content of which is incorporated by reference herein. However, the electrical resistance due to electron tunneling rises very steeply with the interfacial film thickness $S_i$, and ordinary ionic conduction is more efficient than electron tunneling for films of $S_i > 12.2$ nm or so, at which point metal fiber brushes with contact spots would not be able to carry any but miniscule currents.

For example, between $S_i = 0.5$ nm and $S_i = 4$ nm, the film resistivity for electron tunneling rises by about a factor of X=100, i.e., from $\sigma_{Fo} \cong 10^{-12}$ $\Omega m^2$ (a typical value for clean metal fiber brushes in a protective atmosphere) to $\sigma_F = X\sigma_{Fo} = 10^{-6}$ $\Omega cm^2$, which value will be rarely, if ever, exceeded by fiber brushes operating with contact spots. Namely, practical experience by the present inventor has indicated that sparking will result when the voltage drop between the brush/substrate interface exceeds about 1 Volt, while according to eq. 20.27 of the already cited "Metal Fiber Brushes" (Chapter 20 in "Electrical Contacts: Principles and Applications") the specific brush resistance for a metal fiber brush with contact spots is, very approximately, $R_B A_B \approx 3.4 \times 10^4 \sigma_F$. Thus, a film resistivity $\sigma_F = X\sigma_{Fo}$ with $\sigma_{Fo} = 10^{-12}$ $\Omega m^2$ will permit a current density $j = i/A_B$ of $$j_{arc} \cong 1\ [V]/\{3.4 \times 10^4 X\sigma_{Fo}\} = 860/X [A/cm^2] \quad (3)$$

meaning that a metal fiber brush operating with contact spots, is liable to arc when the current density reaches $j_{arc}$.

The already mentioned brush operating with $S_i = 4$ nm and thus $\sigma_F \cong 10^{-10}$ $\Omega m^2$ for X=100 will hence be expected to carry no more than 8 $A/cm^2$. Since metal fiber brushes will normally be expected to carry a current density of at least 10 $A/cm^2$, film thickness $S_i = 4$ nm and X=100 are realistic upper limits for brushes operating with contact spots.

The picture changes dramatically if the whole cross sections of the fiber ends should contact the substrate via a surface film that conducts through either electron tunneling or even ordinary conduction, and observations indicate that this could indeed be approximated in the most favorable cases. If so, the maximum current conducting area is $fA_B$ with f the "packing fraction" of the brush, i.e. the percentage that the metal fibers represent of the macroscopic brush volume, for a minimum brush resistance of $R_B A_B = \sigma_F / f$, i.e.

$$j_{arc} \lessapprox f[V]/\{Y\sigma_{Fo}\} = 1.5 \times 10^7 / Y [A/cm^2] \quad (4a)$$

For a desired 860 $A/cm^2$ current density, as optimally achievable by way of a double mono-molecular layer of adsorbed moisture on contact spots according to eq.3 with X=1, then, $$Y = 1.5 \times 10^7 / 860 = 1.7 \times 10^4 \quad (4b)$$

i.e., permitting a film resistivity of $$\sigma_{Fmax} = Y\sigma_{Fo} = 1.7 \times 10^4 \times 10^{-12} [\Omega m^2] = 1.7 \times 10^{-8} [\Omega m^2] \quad (4c)$$

which according to FIG. 20.4 of "Metal Fiber Brushes" indicates a film thickness of about $S_i = 90$ nm. Realistic technological peak demands on the current density of brushes are more nearly j=100 $A/cm^2$ or even higher, requiring $\sigma_F < 1.5 \times 10^{-7} [\Omega m^2]$, which may be satisfied with $S_i \cong 10$ nm.

For still larger $S_i$-values, the film resistivity for electron tunneling rises very steeply. However, the steep decrease of film resistivity with $S_i$ value, will cause current conduction to be strongly concentrated at locally decreased film thicknesses, in general accounting for the fraction $f_C \leqq 1$ of the fiber foot print area. These areas are due to unavoidable surface undulations and act somewhat like very large contact spots, that for $f_C = 1$ include all of the fiber end footprints. These areas are different from contact spots in that the local pressure at these areas is far lower than the pressure of $\beta H$ at contact spots, with H the "Miller hardness" and $\beta \cong 1/3$. Therefore, on account of the "squeezing out" between the substrate and fiber ends or the fraction $f_C$ of their footprint, respectively, $S_i$ values, will typically be rather lower than the average surface film thickness S on the conductive substrate (e.g. the above-noted rotor), and satisfactory brush operation with, say, 1.5 nm $\leqq S_i \leqq$ 12 nm will be obtained with average as-deposited film thicknesses of at least S=100 nm or perhaps even 1 $\mu$m, especially for conditioning materials of lower viscosity.

The ideal case in which all of the fiber ends in a metal fiber brush fully contact the substrate and fully conduct current, instead of only small contact spots, i.e. $f_C = 1$, is unlikely, although not impossible, to be achieved. More realistically a fraction of, say, $f_C \leqq 0.1 = 10\%$ of the fiber ends may so conduct, as indicated in FIG. 6. If so, the achievable current density will be reduced since it is proportional to that factor $f_C$, and the achievable current density will be increased by a reduction of $S_i$ with a dramatic impact on brush resistance. For example, following eq.4a with $f_C=0.1$ a desired top current density of 860 A/$cm^2$ at 1 V contact drop will require $$j_{arc} \cong f_C f[V]/\{Y\sigma_{Fo}\} = 1.5\times10^6/Y[A/cm^2] = 860\ [A/cm^2] \quad (5a)$$

for $Y=1.7\times10^3$, i.e. $\sigma_F=1.7\times10^3\sigma_{Fo}=1.7\times10^{-9}[\Omega m^2]$ that according to FIG. 20.4 corresponds to $S_i=8.5$ nm.

In summary, and as already reflected in the various estimates of S and $S_i$ above, like adsorbed water, so also conditioning films will move about the surface, at least somewhat. This means that, in line with the illustration in FIG. 6, conditioning films have a greater average thicknesses S than the $S_i$ values calculated above since these relate to the most favorable locations with the lowest electrical resistance over the fraction $f_C$ of the fiber end area.

Conceptionally rather simpler than the preceding considerations regarding the maximum conditioning film thicknesses, is the assessment of the minimum conditioning film thickness as follows. Seeing that the conditioning film needs to separate substrate and fibers everywhere, not only where the film happens to conduct current, and seeing that such areas will move about erratically, the conditioning material will be expected to cover all of the substrate with a greater average thickness than the above computed $S_i$-values. Moreover, prevention of cold welding requires the presence of at least one monomolecular layer on each side, i.e. about 0.5 nm as for adsorbed water. Allowing, then, a safety factor of three for the indicated movements of the conditioning material, a minimum useable conditioning film thickness of approximately 1.5 mm in order to prevent cold-welding and thus undue brush wear and damage to the substrate, is derived.

In summary, for metal fiber brushes operating with contact spots, conditioning films, if any, should preferably be less that 2 nm thick, especially for demanding applications, such as in homopolar machines. However, in the presence of conditioning films according to the present invention, smooth fiber ends without contact spots such as those that could be produced especially by paste-like conditioning materials, current is conducted over a sizeable fraction $f_C$ f of $A_B$ (see eq. 1c) with, say, f=0.15 and $0.01 \leqq f_C \leqq 1$, and thus much larger than for traditional contact spots, with $A_C \cong 2.5\times10^{-5}\ A_B$(1b). In that case, conditioning films may have current conductive areas in which the average interfacial film thickness $S_i$ is preferably 1.5 nm≦Si≦10 nm, perhaps 2 nm≦$S_i$≦5 nm, whereas the average film thickness on the substrate could be S=200 nm or even larger, e.g., up to 1.0 μm. This higher value is particularly apt because fairly fluid conditioning materials will squeeze out at least partially under fiber end foot prints and most likely in more restricted current conducting areas so that their average thicknesses outside of these could be considerably larger than in the interfacial region, depending on speed and viscosity, among others. Furthermore, while the present invention is applicable to metal fiber brushes as disclosed in U.S. Pat. No. 6,245,440, the present invention is also applicable to monolithic brushes, e.g., brushes having as few as a single conductive element.

The above model of metal fiber brush operation without contact spots due to polishing conditioning materials outlined above, so as to greatly expand the area through which current is conducted on a microscopic scale, has a strong implication also for the friction coefficient, μ. Namely, in a first-order approximation, μ is expected to be proportional to the sheared area and inversely proportional to the film thickness, besides a factor G that represents the ratio of the intrinsic viscosity of the conditioning film relative to that of a double molecular layer of water. In comparison with adsorbed moisture, that at a layer thickness of $S_o$=5 Å and being sheared over the relative contact spot area $A_C/A_B \cong \times10^{-5}$ (eq.1b) produces the friction coefficient $\mu_o=0.34$, one thus will estimate, with the values of f=0.15, $f_C=0.1$, and $S_i$=5 nm (for approximately the same brush resistance), $$\mu = G\mu_o f_C f(A_B/A_C)S_o/S_i \cong G0.34\times0.1\times0.15\times(2.5\times10^{-5})^{-1}\times5[\text{Å}]/5\ [nm] = 20G \quad (6)$$

Seeing that practically speaking, friction coefficients must not exceed, say, μ=3, this is a higher than expected result since G will not be far from, but presumably may be somewhat smaller than, unity and $f_C=0.1$ is a plausible estimate. Therefore, with G occasionally perhaps as low as 0.1, while $f_c$ could decrease to several percent, e.g. $f_c$>~0.01 to ~0.03, the friction coefficient due to successful conditioning films is typically larger than for adsorbed moisture but could drop to below this. Accordingly, based on available measurements and in line with the above analysis, the friction coefficients of successful conditioning films may range between 0.2 and 3, while still larger friction coefficients due to practical reasons (i.e. high power loss, macroscopic deformation of brushes and possible damage to the substrate) are preferably avoided by decreasing $f_C$ and increasing $S_i$, albeit at the cost of increasing electrical brush resistance.

In fact, measurement data reveal a considerable spread in not only the apparent film resistivity (i.e. in fact $\sigma_F/\sigma_{Fo}$ if measured in units of $10^{-12}\ \Omega m^2$), and the friction coefficient, but also of wear rates, and the insensitivity to temperature and humidity, if any. The outlined theory accounts for such a spread of possible behaviors and properties even of successful conditioning films, since these will depend on their viscosity (i.e. G), to what degree the fiber ends are polished free of contact spots, and the resultant value of $f_C$ and $S_i$. All of these results may and typically do depend on the nature of the conditioning material, brush construction and running conditions including sliding speed and current density, all of which influence the film thickness and friction. These variables generate the observed rather wide spread of measured brush resistances, i.e. measured film resistivities, coefficients of friction and wear rates, even for one and the same brush and conditioning material, namely depending on sliding speed, brush pressure and current densities. At the same time, the above considerations reveal the difficulty of adjusting conditions for a favorable balance between electrical resistance, friction coefficient and dimensionless wear rate. In any event, assuming that the above considerations leading to eq.6 are reasonable, these results illuminate a fundamental challenge in applying brush conditioning according to the present invention, namely to find and operate at combinations of coefficient of friction and brush resistances that are simultaneously competitive. Experience shows that this can be done but typically at relatively low β values, down to, say, 0.1, that are expected to decrease $f_C$ and increase $S_i$.

Next, the requisite film thickness, $S_C$, of conditioning material is estimated as follows: In order to deposit conditioning films at the same rate as the conditioning films are worn off, the thickness, $S_C$, of the layers on the fibers inside of the brushes, will typically have to be several to many times larger than the average thickness S of the conditioning film on the substrate. Specifically, if wear shortens a single fiber of diameter d by length h, the conditioning material volume of $$V_C = \pi dhS_C \quad (7)$$

is lost from the brush. This may be lost by various mechanisms not yet fully understood. However, the preponderance of this material will be distributed on the wear particles in the form of films of similar thickness as that of the conditioning film. Typically (see "A Case of Wear Particle Formation Through Shearing-Off at Contact Spots Interlocked Through Micro-Roughness in 'Adhesive' Wear", Y. J. Chang and D. Kuhlmann-Wilsdorf, Wear of Materials—1987 (Ed. K. C. Ludema, Am. Soc. Mech. Eng., New York, 1987), pp. 163-174; see also Wear 120 (1987), pp. 175-197), the entire contents of which are incorporated by reference herein, the average wear debris of metal fiber brushes is flattened into chips that are about 0.6 times as thick as their average diameter, $d_W$. If so, the volume of the average wear chip is $$V_W \approx 0.15\pi d_W^3 \tag{8}$$

and the volume of fiber brush wear $V_F = \pi d^2 h/4$, produces $$N_W = V_F/V_W = \pi d^2 h/(0.6\pi d_W^3/2.5) = 1.67 d^2 h/d_W^3 \tag{9}$$

wear chips.

With the average surface area per wear chip of $A_W \pi d_W^2/2$, the volume of conditioning material required for a layer thickness of S on each will be $SN_W A_W = 1.25\pi Sd^2 h/d_W$ which, if other loss mechanisms are negligible, must in steady state be provided by the conditioning material volume $V_C$, since the thickness of the conditioning film on the interface remains unchanged. Hence $$\pi dhS_C = SN_W A_W = S(1.67 d^2 h/d_W^3)(\pi d_W^2/2) = S(0.83\pi d^2 h/d_W) \tag{10}$$

$$\text{i.e. } S_C/S = 1.25 d/d_W \tag{11}$$

In the practical example of Table 1, with d=50 μm and an average wear chip diameter not well known but believed to be about $d_W \approx 1$ μm, therefore, a S=10 nm film thickness requires $S_C = 0.83\ Sd/d_W \approx 400$ nm=0.4 μm according to eq.11.

Next, the surface area of fibers inside of unit volume of brush with packing fraction f and fiber diameter d is 4f/d [surface area/volume]. Thus if the average wear chip is about 1.7 times thinner than its average diameter, a surface layer of $S_C = 0.83Sd/d_W$ requires $S_C(4f/d) = 3.3fS/d_W$ volume of conditioning material per unit brush volume. If the conditioning material is contained in a solution of volume concentration c, the brush must correspondingly be filled with a volume of 3.3 f $S/cd_W$ solution per unit volume of brush. Meanwhile the void volume in the brush is (1-f) per unit volume so that if the brush is completely soaked with the solution which then is evaporated, it requires the concentration $c_o$ to obtain the intended fiber brush coverage of conditioning material in the brush. Correspondingly, the desired film thickness S, is obtained with a brush whose voidage is filled with a solution of volume concentration $c_o$ of the desired conditioning material. On drying the conditioning material will deposit in a fairly uniform layer on the interior fiber surfaces, that in turn produces the conditioning film thickness S on the substrate. The result of this model yields:

$$c_o \approx 3.3fS/(1-f)d_w \cong 0.6S/d_W \tag{12}$$

Using the same example as above, namely a packing fraction of f=15%, an average wear chip diameter of $d_W$=1 Ξm=1000 nm and wear chip thickness 0.6 $d_w$, with S=10 nm, one finds $c_o \cong 0.6\%$ which is in good agreement with the data in Table 1 below. In fact, concentrations ranging about ½ % were used in successful conditioning treatments, while much leaner solutions, e.g. below 0.1% did not provide the desired amount of conditioning and much more concentrated solutions, e.g. 10%, led to arcing. In fact, especially at the beginning of brush use, there can be arcing even with concentrations that eventually give very satisfactory results which is believed to be due to excess conditioning material at the fiber tips if they have not been cleaned off prior to use. This, then, strongly indicates that the theoretical relationships as well as the numerical estimates are basically sound.

In general, using the same variables, it is $$S = (1-f)d_W c_o/5f \tag{13}$$

and $$S_C = (1-f)dc_o/4f \tag{14}$$

Based on the above considerations and according to the present invention, the layer thickness, $S_c$, of the conditioning material on the interior fiber surfaces can vary widely, depending on the various parameters involved, foremost among them the fiber diameter and wear chip diameter. Considering that the fiber diameter was uniformly d=50 μm in Table 1 and that the same rotors were used throughout, with all similar brush pressures and sliding rates, wear chip sizes are liable to have been more uniform in those experiments than would be expected if these parameters were varied.

Consequently, the range of experimental $S_c$ data for successful conditioning layers recorded in Table 1 is liable to be considerably smaller than actual technological limits. Correspondingly, it is believed that in practice, $S_C$ may range at least between about 0.05 μm and above 10 μm, e.g. 0.05 μm≦$S_C$≦10 μm, or 0.01 μm≦$S_C$≦15 μm., 0.02 μm≦$S_C$≦5.6 μm, depending on details of theoretical estimate, or 0.070 μm≦$S_C$≦0.560 μm according to the limited and too restrictive data in Table 1.

Accordingly, the average layer thickness of successful conditioning materials on the substrate may range between 1.5 nm≦S≦1 μm, or from several molecular layers to 0.3 μm, or 1.5 nm≦S≦0.51 μm, depending on details of theoretical estimate, or 5.7 nm≦S≦22 nm according to the limited and too restrictive data in Table 1.

Data of film resistivities, friction coefficients and micromorphology of fiber ends as well as micrographic observations on interfaces and wear debris, broadly support the preceding theoretical and practical considerations. The present invention has therefore concentrated on identifying suitable conditioning materials that not only replace the normal adsorbed water films (as the typically most important property) but do so at some compromise between not too high film resistivities (i.e., trying to keep the film thickness small) and long enough brush life times (that tend to rise with film thickness but decrease with friction) even while having to avoid arcing and to fulfill as nearly as possible the above list of desirable properties. Additionally, long brush lifetimes require that wear debris does not clog the spaces between the fiber ends. That indeed is a problem, especially when using fluid contact lubricants, such as oils. For the same reason, also, the thinnest possible conditioning films are desirable. As a remedy in case of need, rotors with straight or spiraling grooves can be used as known in the art.

A detailed consideration of the desirable properties of conditioning materials presented above will further illustrate some of the principles in the present invention, as follows:

a) The property of not being readily worn off is dependent on some of the other properties in the list. Specifically, this property indicates that the conditioning material should preferably be chemically inert, at least relative to the ambient chemicals, since any, even fairly slow chemical reactions will be destructive to the layers on the fibers inside the brushes and also, more directly, will destroy the conditioning film. This principle is demonstrated by a class of materials on which many unsuccessful tests were made because the materials were initially believed to be prime candidates. These unsuccessful materials included various metal sulfides, foremost among them $MoS_2$ and $WS_2$, by themselves and mixed with various other substances. All of these failed, when used in the open atmosphere, mainly because of reaction with moisture.

b) Clearly, in line with a) above, the conditioning material should preferably be chemically inert so as to be durable.

c) Next, the conditioning material should preferably be not toxic, if for no other reason than OSHA requirements.

d) Similarly, the conditioning material should preferably be non-volatile, at least to the degree that the film outside of brush foot prints will not evaporate to significantly remove the film in the life time of the brushes. For expected film thickness of, for example, $S_i$=10 nm and less, even a few evaporated molecular layers can change film properties, and such losses may be expected during idle time, or even in the course of the typically quite slow wear, and thus slow deposition of conditioning film material.

e) The conditioning material should preferably be adherent to the substrate (which implies clinging to the brush material. (f) This is important because the material must adsorb more strongly to the interface than do adsorbed water molecules in order to displace these for successful operation. While a very large number of materials would fulfill the three already enumerated requirements as well as some of the following ones, the present condition serves to make a large fraction of potential choices not as desirable. One may recognize materials that fulfill this requirement, among them detergents, by their strong ability to cover surfaces and, once having formed a layer, typically to repel water.

According to the present invention, one may make use of already existing results of industrial research. Recognizing that there are many industrial uses for the property of displacing adsorbed water and tenaciously clinging to a clean metal substrate, many commercially available materials, foremost among them cleaning and polishing materials, especially those that confer some water repellency, would be suitable conditioning materials for the present invention.

Thus, a first search among glass and metal polishes and cleaners that leave no streaks and confer some water resistance was conducted. The window cleaner TipTop® (Colgate-Palmolive, Hamburg, Germany) was chosen as the first example, mainly because it was the best window cleaner known to, and used by, the present inventor. As demonstrated by the data in Table 1, this immediate success strongly implies that numerous other successful conditioning candidates will be found among any other glass, metal and car polishes, especially those that confer water repellency. An example of such is Turtle® car wax. Additionally, textile conditioners, such as prominently Scotch Guard in its different modifications (i.e. for fabrics, carpets and leather), and also hair sprays are expected to be suitable for metal fiber brush conditioners. Such scotchguard compounds believed to be suitable for the present invention include (but are not limited to) the following scotchguard compounds described in the following U.S. Patents. U.S. Pat. No. 6,818,253 to Kimbrell (Nov. 16, 2004), the entire contents of which are incorporated by reference, describes "Scotchguard FC-248" from 3M. U.S. Pat. No. 6,818,717 to Kantamneni Nov. 16, 2004, the entire contents of which are incorporated by reference, describes Scotchguard FC-248 (3M Company). U.S. Pat. No. 6,746,976 to Urankar, et al. Jun. 8, 2004, the entire contents of which are incorporated by reference, describes a "polytetrafluoroethylene compound like SCOTCHGUARD." U.S. Pat. No. 6,794,010 to Yamaguchi, et al. Sep. 21, 2004, the entire contents of which are incorporated by reference, describes "SCOTCHGUARD FX-1367F, FX-1373M, FX-1355, FC-393, FC-367, FC-369, FC-398, FC-399 (Minnesota Mining and Manufacturing Co.) . . . " U.S. Pat. No. 6,703,537 to Roe, et al. Mar. 9, 2004, the entire contents of which are incorporated by reference, describes "a polytetrafluoroethylene compound like SCOTCHGUARD . . . " U.S. Pat. No. 6,531,440 to White Mar. 11, 2003, the entire contents of which are incorporated by reference, describes the following formulation as corresponding to SCOTCHGUARD Protective Gel sold by the Minnesota Mining and Manufacturing Company, St. Paul, Minn.

Item Weight %
Water 62.9*
Carbopol 1342 (thickener) 0.75
Isopropanol (cleaner) 4.0
Propylene glycol monomethylether (cleaner) 6.0
UVINUL N-3039 (UV absorber) 2.0
Genesee GP 7105E (silicone) 15.0 (6 silicone**)
Union Carbide ALE-75 (silicone) 7.5 (4.1 silicone**)
Triethanolamine (neutralizing agent) 1.9

*Genesee GP 7105E contains 40 percent water and therefore contributes 6 percent of the total water. Union Carbide ALE-75 contains 40 percent water and therefore contributes 3 percent of the total water. Thus, 9 percent of the water in the composition is provided by the silicone emulsions and 53.9 percent of the water in the composition is provided as deionized water.

**Genesee GP 7105E contains 40 percent silicone and Union Carbide ALE-75 contains 55 percent silicone. Thus, the composition contains 10.1 percent silicone by weight.

The solvents contained in the scotchguard (i.e., principally water) are, upon application and drying, reduced as detailed above so that the scotchguard becomes thoroughly dry (i.e., dried of water). As such, the concentration of water in the applied conditioning material reduces from the initial 62.9% water concentration in this example to produce a thoroughly dry conditioning material. As the water concentration reduces below 50%, the remaining materials in the scotchguard compound become the majority component of the conditioning material.

Looking further to successful commercial products, soaps and detergents, especially if developed for cleaning in conjunction with water, present successful metal fiber brush conditioners, provided that the brushes are not directly exposed to water. This was tested and verified by the example of Alconox® (Alconox Inc., 9E 40$^{th}$ Street, New York, N.Y. 10016) as shown in Table 1. Further, dishwasher soaps are desirable. However, as indicated in Table 1, while the conditioning films deposited by water-soluble products (e.g. Tip Top and Alconox) appeared to be independent of humidity and to be capable of operation between the temperatures of liquid nitrogen and at least 150° C., dripping water on the brushes damaged these in short order. This may be caused by dissolving the conditioning layers on the interior brush fiber surfaces. Therefore, it appears as if these particular conditioning materials can be very desirable but only as long as the brushes are shielded from direct water exposure. Also, such conditioning materials may be directly applied on brush tracks through sliders or swabs, painting on in the form of dilute solutions, or similarly spraying on or applying in the form of a foam.

Another source of suitable conditioning materials are compounds isolated from Nature and/or modified further therefrom. This is so because Nature may provide conditioning materials, typically by means of invisible films, where confronted with a similar challenge, i.e. to displace adsorbed water and provide materials that cling tenaciously to selected surfaces, e.g. to waterproof fruit, furs, seeds, flower petals, insects, bird feathers, leaves etc. This was verified by an example of isolated anhydrous lanolin which is nature's conditioner for sheep's wool. Similarly, vaseline/petroleum jelly is known to tenaciously cling to metals and to offer water protection and was used as another natural product. A third example is Carnauba wax (a natural product of the carnauba palm that is an ingredient in some expensive car and floor polishes).

Paraffin was tested as an example of a pure material of simple chemical structure (albeit containing a mixture of molecules of same structure but different chain lengths) but it was found that it may not be very suitable, because it may give rise to erratic arcing. Its tendency to stick strongly to itself and its low melting point may be the cause for its failure. However, optimization of conditions could lead to useful applications of paraffin within the scope of the present invention. Anyway the observations on paraffin reinforce the impression, already gained from the other tests, that more successful conditioning materials may have complex molecular structures, including fairly long chain lengths and branching or double chains, and perhaps even more importantly, involve chain molecules of different chemical structure.

g) That a successful conditioning material should preferably be amenable to incorporation into brushes so as to be deposited on the substrate in the course of brush wear, appears to be self-evident since this is a precondition for its use. One method according to the present invention involves dissolving the material in some liquid solvent. Examples of the solvent include water, petroleum, acetone, naphtha, ethyl alcohol, methyl alcohol, ether, toluene, a petroleum distillate and any other organic volatile solvent. Of these, water and naphtha are exemplified below. Since no basic differences in behavior were noticed among those examples, it is concluded that indeed a suitable solvent will be one that (1) can be evaporated at a temperature low enough not to damage the brush or the conditioning material left behind on the fibers, e.g. about 150° C., (2) does not contain a contaminant that interferes with the ultimate conditioning film on the substrate and (3) is free of unrelated problems such as being corrosive or chemically aggressive.

h) The property of being hydrophobic (so as not to dissolve under humid or wet conditions), applies to the deposited conditioning film but not necessarily to the initial material that is incorporated into the fiber brushes. Thus TipTop® (Colgate—Palmolive, Hamburg, Germany) is certainly not hydrophobic, nor are dish washer soaps, e.g. Alconox (Alconox Inc., 9E 40$^{th}$ Street, New York, N.Y. 10016) both of which are introduced into the brushes as a solution in water. However, the films left behind by these on substrates are at least somewhat water repellent and hydrophobic in nature.

i) The requirement of being shearable at low shear stresses so as to yield low friction coefficients may also be desirable although difficult to predict. Shearability is preferred, and low viscosity, i.e. low friction, is also desired.

j) One difficult to obtain, and not easily predictable but yet noteworthy property is that of not causing wear debris to cluster so as to cake fiber ends together. In fact, by their nature, tenaciously clinging films will tend to cause small wear particles which are coated with the film material and as a result cluster together and collect at metal fiber ends. So far, in tests of the most successful conditioning materials, collected wear debris has included numerous microscopic to pinhead sized wear particle clusters that are lodged between neighboring fiber ends. It is believed that once such clusters have attained some critical size, they will be flung off through the friction force of the moving substrate. Based on the available evidence so far, it is believed that this valuable property of brush running surfaces not being clogged up with wear debris, depends on a somewhat high viscosity of the conditioning material, so that the clusters are somewhat stiff and do not smear out to fill the interstices between the fiber ends. Correspondingly, it is believed that the too low viscosity of paraffin at mildly elevated temperatures permits such unwanted clustering and is the major reason for the already discussed failure of paraffin. For the same reason, oils do not appear to provide good conditioning materials although these oils, like paraffin, remain candidates for some applications. Conversely, the consistency of waxes (e.g Carnauba wax) makes these waxes prime candidates for conditioning materials.

k) That the material should be preferably non-corrosive.

l) Chemical/thermodynamical stability of the conditioning materials, inside of brushes and in the form of conditioning films, is preferable but difficult to ascertain in the presence of elevated temperatures, high current densities and magnetic fields. Yet, stability is needed as increasingly technological demands raise the expected brush life times from months to years and to the life expectancy of the host equipment.

m) Mechanical stability falls into the same category as chemical/thermo-dynamical stability. Based on present practical experience with a number of brushes, it is already known that fiber materials so far used have the requisite durability, including resistance against mechanical fatiguing. In one embodiment of the present invention, for conditioning brushes, the interior layers of conditioning material on the fiber preferably will not either coalesce or slowly creep along the fibers under the force of, for example, gravity or of electric field gradients.

n) The property of being applicable in a wide range of temperatures, optimally from well below freezing to above boiling temperature, is not positively essential but valuable since a prime goal of the replacement of adsorbed moisture through a conditioning film is just that, i.e. to expand the temperature range of successful brush operation.

o) Preferably, conditioning films protect the substrate as well as the brushes from oxidation so as to obviate the need for noble metals and/or noble metal plating. However, the complete coverage of the substrate by an inert conditioning material does not automatically provide such protection. Oxygen diffusion through the conditioning material layers is a consideration.

The above described method of displacing adsorbed moisture films by thin conditioning films according to the present invention is applicable also to monolithic brushes. Experiments have shown that graphite brushes deposit on such conditioning films a graphite track more rapidly than on untreated metal. This observation is in line with expectations if the conditioning material also strongly adheres to graphite. Such an observation opens the opportunity to pinpoint suitable conditioning materials for monolithic brushes and impregnate brushes with these. Thereby, the monolithic brushes are expected to become usable in the absence of moisture, e.g. in space, albeit quite likely at a somewhat increased wear rate. Indeed, it is believed that the conditioning of the present invention will have application for example in the absence of humidity, e.g. in space, as already indicated.

Wear rates of metal fiber brushes with successful conditioning films can be very low (see Table 1) and can remain essentially constant for long time periods, e.g., beyond one year.

The potential difficulty of clustering of wear debris discussed above, is that it appears to give rise, in conditioning materials of suitably high viscosity, to erratic increases of measured film resistivity while small clumps of wear debris work themselves from out between the brush foot print and the substrate.

In the case that a metal fiber brush lays down a too thick or too thin a conditioning film, as indicated by friction, wear rate and/or brush resistance, according to one embodiment of the present invention, it is possible to apply extra conditioning material by means of a pad of filter paper, cotton wool, felt or other suitable material to which conditioning material has been lightly applied, or conversely to remove excess conditioning material from the sliding track by means of rubbing with a clean pad. Alternatively, the conditioning material may be applied to the substrate by means of painting with a brush or spraying, or applying in the form of foam, e.g. as in ScotchGuard™ for carpets, as already indicated above.

According to one embodiment of the present invention, the above application methods to apply extra conditioning material may also be used to establish and replenish a conditioning film even if the brushes do not contain any conditioning material. The preferred method described above of coating the interior metal fiber surfaces by way of a well-specified solution that is infiltrated into brush stock or into a brush, according to the present invention, has the particular advantage that it provides, on brush operation, a steady supply of the conditioning material at a very slow rate that is difficult to emulate by way of external application, e.g. rubbing, whether by hand or mechanically, or spraying etc.

For example, 1 $cm^3$ of a 1% conditioning solution, containing roughly 0.01 g of conditioning material, may be used on a brush of several $cm^3$ that will wear out in a year of operation. Or perhaps more transparently, an S=100 nm=0.1 μm thick conditioning film on an L=1 m long sliding track of an $A_B$=1 $cm^2$ brush contains only roughly 1 mg of conditioning material. Such exquisitely slow and precisely controllable application of conditioning material will be very hard to duplicate by any other means. Even so, some success may be achieved, both in film application and partial removal by way of lightly impregnated filter paper etc, and such application and its equivalents could be automated in conjunction with the monitoring of brush resistance and friction. The reason for monitoring is the observed tendency of paste-like or waxy conditioning materials to form a film of about the appropriate thickness when applied with light finger pressure and then to accept additional material for thickening the film only with significant oversupply of conditioning material on the applicator in combination with reduced finger pressure.

Hence one way of supplying conditioning films for untreated brushes is to apply conditioning material on a lightly impregnated felt or similar with a pressure corresponding to that of light finger pressure and periodically reapply as the film resistivity decreases, e.g. once every two hours or so.

EXAMPLES

Experiments on a range of materials to-date have shown that successful conditioning film materials may on occasion (but do not typically) lower the friction coefficient, typically will reduce the wear rate, and can significantly reduce or eliminate brush polarity effects. Table 1 in FIGS. 7A to 7C presents relevant data. As an example, in an experiment extending over several days, two metal fiber brushes with an approximately $S_C$=1.4 μm thick surface layer on the interior fiber surfaces of "Tip Top" glass cleaner, exhibited average dimensionless wear rates of $4\times10^{-11}$ and $5\times10^{-11}$ in the open atmosphere at v=16 m/sec sliding speed and current density j=20 to 40 A/$cm^2$. The friction coefficient was $\mu\cong0.4$, and the film resistivity ranged about $\sigma_F\approx2.6\times10^{-12}$ $\Omega m^2$ and $\sigma_F\approx5\times10^{-12}$ $\Omega m^2$ on the positive and negative brush, respectively.

Brushes in Table 1 (see FIGS. 7A to 7C) marked as not sensitive to humidity and temperature are those whose film resistivity and friction changed only by less than a factor of two in short-term tests in a rather wide temperature range, i.e. from at least the boiling point of water to liquid nitrogen. This is seen as proof that the conditioning surface film had at least largely replaced the normal film of adsorbed moisture.

The listed active chemical ingredients or "materials classes" in Table 1 (see FIGS. 7A to 7C), e.g. "detergent" for "TipTop" are not exact. Tested materials classes but not appearing in Table 1, include silicones. Further, not listed in Table 1 are various non-recurring observations such as an unexpected rise of friction in the TipTop brush when the current density was raised to 80 A/$cm^2$ and which was largely but not completely recovered on lowering the current density again. This is believed to be due to a decrease of the viscosity of the conditioning material with rising temperature, thus indicating another feature of the present invention, to with that long-term sustainable current densities are typically lowered compared to brushes operating with contact spots.

As already mentioned above, the data in Table 1 (see FIGS. 7A to 7C) indicate a significant amount of scatter. In agreement with the preceding theoretical considerations, there is a tendency for decreasing friction coefficients (μ) and increasing film resistivities ($\sigma_F$) with increasing film thicknesses, S, e.g. for carnauba wax and Alconox. This is not a universal trend, as seen for example with lanolin. The cause for some of the less predictable behavior may be partly due to "ploughing" of surface roughness through thick films, variations in the degree of contact spot polishing, and uncontrolled changes of other variables, such as extent of area fraction of current conduction $f_c$ and local heating.

As already mentioned, indications are that materials including mixtures of chain molecules of different chemical composition are preferred conditioning materials. In this regard note the favorable data for lanolin and carnauba wax in Table I (see FIGS. 7A to 7C), both of which have such molecular mixtures, and the further possible improvement of dimensionless wear rates and reduction of film resistivity differences between positive and negative brushes of the lanolin/carnauba wax mixture. This beneficial effect of mixing chain molecules of different chemical structure is tentatively ascribed to the increased resistance against molecular rearrangements in the course of long-term shearing and the resulting resistance against "shear thinning" that arises because of an impediment against the mechanical crossing of chemically different polymeric molecules (see the recent article "Polymers Go with the Flow" by G. Marrucci, Science, Vol. 301 No. 5640, pp. 1681-1682, 19th September 2003). Mixtures of polymeric molecules for conditioning materials are therefore preferred embodiments of the present invention.

As suggested by the above data and description and already discussed above, one aspect of the present invention is to provide a brush including the above mentioned conditioning material, which when deposited on a contact surface of a substrate, produces an increased conduction area compared to conduction through contact spots. Such increased conduction area may occur by virtue of polishing and/or removing microscopic asperities to achieve at least a localized more uniform albeit thicker surface film (than adsorbed water) to promote current conduction via electron tunneling, over an increased contact area, even though at an increased local electrical film resistivity, to the effect that the electrical brush resistance might increase or decrease but in any event the wear rate is diminished.

Figure 8:
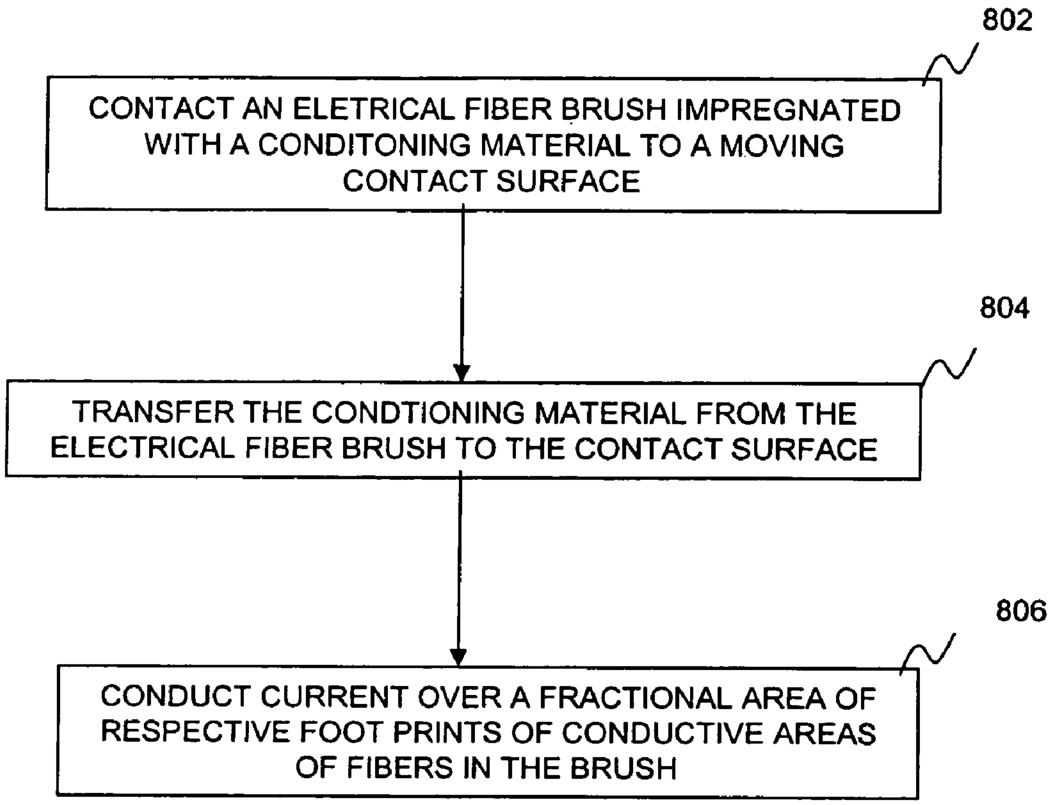
FIG. 8 is a flowchart according to a method of the present invention for making an electrical interface.

Hence, in one embodiment of the present invention, there is provided a method of making an electrical interface, as shown illustratively in FIG. 8. At step 802, an electrical fiber brush impregnated with a conditioning material contacts a moving contact surface. At step 804, the conditioning material from the electrical fiber brush is transferred to the contact surface. At step 806, current is conducted over a fractional area $f_C$, where $0.01 \leqq f_C \leqq 1$, of respective foot prints of the fibers in current conductive areas.

In step 802, the conditioning material can form a coating S on the substrate with a thickness S from 1.5 nm to 1000 nm. In step 806, the conditioning material can form a coating $S_i$ at an interface between the fibers and the substrate having a thickness $S_i$ in the current conductive areas in a range from 1.5 nm to 10 nm.

Figure 9:
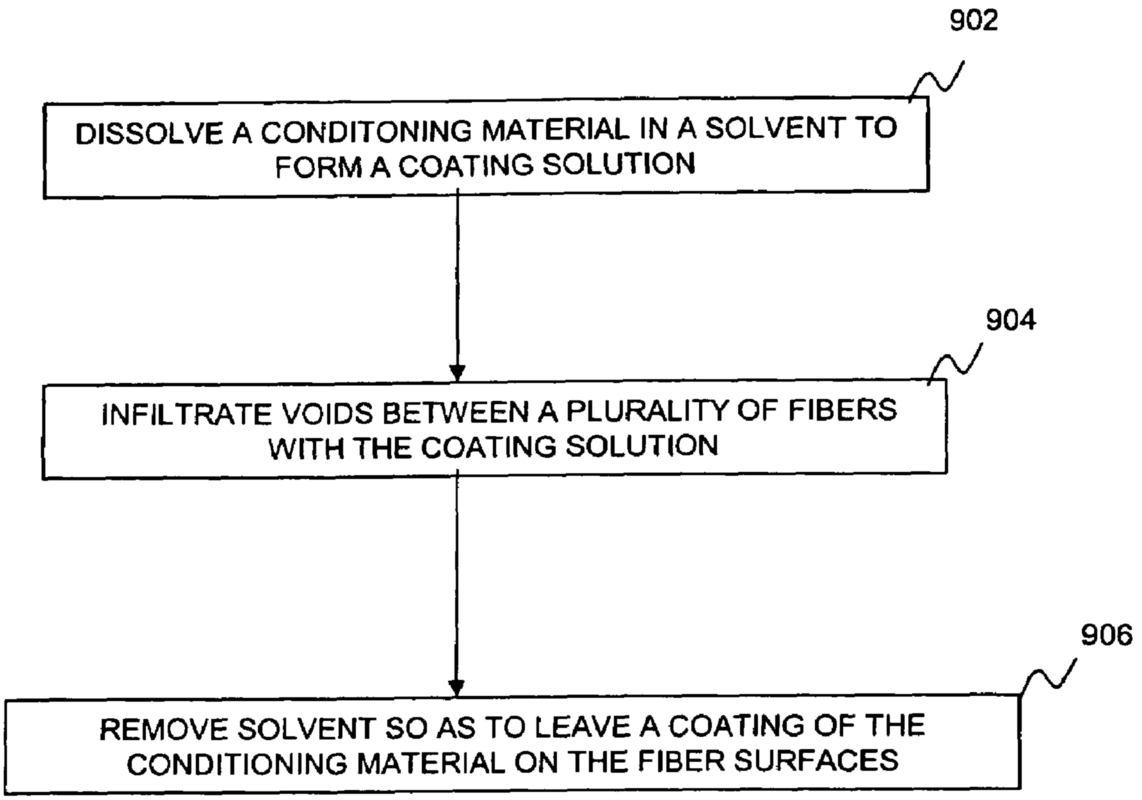
FIG. 9 is a flowchart according to a method of the present invention for making an electrical fiber brush having a plurality of fibers.

Accordingly, in another embodiment of the present invention, there is provided a method for making an electrical fiber brush having a plurality of fibers, as shown illustratively in FIG. 9. At step 902, a conditioning material is dissolved in a solvent to form a coating solution. At step 904, voids between the plurality of fibers are infiltrated with the coating solution. At step 906, the solvent is removed so as to leave a coating of the conditioning material on the fibers having a thickness $S_C$ in a range of from 0.02 μm to 10 μm on the conductive fibers. The conditioning material (when the solvent is removed) has a composition such that, when the electrical fiber brush is in sustained sliding contact with a moving contact surface of a conductive substrate, the conditioning material is in a dynamic equilibrium between deposition and removal to generate an average film thickness S on the contact surface ranging from several atomic layers to 1 μm so that current is conducted over a fraction $f_C$, where $0.01 \leqq f_C \leqq 1$, of foot prints of the plurality of fibers in current conductive areas in which a film thickness $S_i$ of the conditioning material between the current conductive areas is between 1.5 nm and 12 nm thick.

At step 906, the conditioning material can be coated on the conductive fibers with an average thickness $S_C$ of from 0.02 $\mu m \leqq S_C \leqq 5.6$ μm, the conditioning material having a composition such that when the brush slides on a contact surface, the conditioning material is deposited with an average film thickness on the surface of 1.5 $nm \leqq S \leqq 1$ μm, $0.03 \leqq f_C \leqq 1$, and/or 1.5 $nm \leqq S_i \leqq 12$ nm. At step 906, the conditioning film can be formed in the current conductive areas to a thickness $S_i \leqq 10$ nm.

At step 902, the conditioning material can include at least one of a wax, oil, soap, detergent, silicone, vaseline, lanoline, wetting agent, glass cleaner, metal cleaner, metal polish, car polish, car cleaner, car wax, dish washer soap, hair spray, and/or isolated natural wax. At step 906, the solvent can be removed from the fibers by evaporation of the solvent from surfaces of the brush, as for example while rotating the brush while the solvent or carrier liquid evaporates. The brush can be rotated about an axis of rotation that is approximately horizontal and passes approximately through a geometrical center of the electrical fiber brush or about an axis of rotation that is approximately horizontal and approximately parallel to an average fiber direction.

At step 904, the conditioning material can be applied to the plurality of the fibers with an applicator impregnated with the conditioning material. The conditioning material can be applied by coating individual ones of the fibers with the conditioning material from which a fiber brush can be made. Coating of the individual fibers can occur by pulling the individual fibers through a reservoir of the conditioning material. In a preferred method, the "fibers" would still be in the form of a spool of wire from which they are cut. Alternatively, the fiber brush can be made from a plurality of uncoated fibers and then coating the fibers in the fiber brush with the conditioning material. Indeed, coating of the fiber brush can occur by pulling the fiber brush through a reservoir of the conditioning material or a solution of the conditioning material, or by flowing the conditioning material of a solution of the conditioning material through the fiber brush by means of a pressure gradient.

At step 904, the conditioning material can be applied by coating individual ones of the fibers with the conditioning material by spraying, painting, and/or depositing the conditioning material on individual ones of the fibers or of lengths of fiber material before they are cut into pieces. Alternatively, the conditioning material can be applied by coating a fiber brush with the conditioning material by at least one of spraying, painting, and depositing the conditioning material (for example simultaneously) on the fibers in the fiber brush.

Further, in this method embodiment, the conditioning material can be applied to the contact surface with an applicator impregnated with the conditioning material, using for example cloth, felt, filter paper, swab of cotton, and/or wool.

Numerous modifications and variations on the present invention are possible in light of the above teachings. It is, therefore, to be understood that within the scope of the accompanying claims, the invention may be practiced otherwise than as specifically described herein.

The invention claimed is:

1. An electrical brush for electrically contacting a moving contact surface, comprising:

plural conductive elements;

at least one conditioning material disposed on interior ones of the plural conductive elements and in contact with the moving contact surface;

a thickness of the conditioning material on the plural conductive elements ranging from $S_C$=0.01 μm to 15 μm;

the conditioning material having a composition such that, when in sliding contact with a moving contact surface, the conditioning material has an average film thickness on the contact surface of S from several atomic layers to 1 μm, so that current is conducted over a fractional conducting area $f_C$ of the contact surface S, where $0.01 \leqq f_C \leqq 1$;

a foot print of the conductive elements having a current conductive area in which a film thickness $S_i$ is 1.0 $nm \leqq S_i \leqq 12$ nm thick; and said at least one conditioning material includes at least one of a lanoline compound, a triazole compound, and a scotchguard compound.

2. The brush according to claim 1, wherein said at least one conditioning material comprises said lanoline compound.

3. The brush according to claim 2, wherein said lanolin compound comprises at least one material selected from the group consisting of lanolin oil, lanolin wax, anhydrous lanolin, lanolin alcohol, lanolin fatty acid, isopropyllanolate, ethoxylated lanolin, ethoxylated lanolin alcohol, ethoxolated cholesterol, propoxylated lanolin alcohol, acetylated lanolin, acetylated lanolin alcohol, lanolin alcohol linoleate, lanolin alcohol recinoleate, acetate of lanolin alcohol recinoleate, acetate of lanolin alcohol recinoleate, acetate of ethoxylated alcohols ester, hydrogenolysis of lanolin, ethoxylated hydrogenated lanolin, and ethoxylated sorbitol lanolin.

4. The brush according to claim 1, wherein said at least one conditioning material comprises said triazole compound.

5. The brush according to claim 4, wherein said triazole compound comprises 1H-Benzotriazole.

6. The brush according to claim 1, wherein said at least one conditioning material comprises said scotchguard compound.

7. The brush according to claim 6, wherein said scotchguard compound comprises at least one of a fluorinated compound and a silicone compound.

8. The brush according to claim 1, wherein said at least one conditioning material is coated on the plural conductive elements and has a thickness in a range of from $S_C$=0.01 μm to 15 μm.

9. An electrical brush for electrically contacting a moving contact surface, comprising:

plural conductive elements;

at least one conditioning material disposed on interior ones of the plural conductive elements and in contact with the moving contact surface;

a thickness of the conditioning material on the plural conductive elements ranges from $S_C$=0.01 μm to 15 μm;

the conditioning material having a composition such that, when in sliding contact with a moving contact surface, the conditioning material has an average film thickness on the contact surface of S from several atomic layers to 1 μm, so that current is conducted over a fractional conducting area $f_C$ of the contact surface S, where $0.01 \leqq f_C \leqq 1$; and a foot print of the conductive elements having a current conductive area in which a film thickness $S_i$ is 1.0 nm$\leqq S_i \leqq$12 nm thick.

10. The brush according to claim 9, wherein:

the conditioning material is coated on the conductive elements with an average thickness of from $S_C$=0.05 μm to 10 μm, the conditioning material having a composition such that when the brush is in sliding contact with a moving contact surface, the conditioning material has an average film thickness on the contact surface of 1.5 nm$\leqq S \leqq$1 μm;

$0.03 \leqq f_C \leqq 1$; and 1.0 nm$\leqq S_i \leqq$12 nm.

11. The brush according to claim 10, wherein:

S ranges from two molecular layers to 0.5 μm.

12. The brush according to claims 9 or 10, wherein the conditioning material comprises at least one material selected from the group consisting of a wax, oil, soap, detergent, antioxidant, corrosion inhibitor, silicone, vaseline, lanoline, wetting agent, glass cleaner, metal cleaner, metal polish, car polish, car cleaner, car wax, dish washer soap, hair spray, and isolated natural wax.

13. The brush according to claims 9 or 10, wherein the conditioning material is coated on the at least one conductive element by dissolving the conditioning material in a solvent or carrier liquid selected from the group consisting of water, alcohol, ketone, ether, acetone, toluene, naphtha, petroleum, ethyl alcohol, methyl alcohol, a petroleum distillate, a hydrofluorocarbon-based solvent, an organic volatile solvent, and removing the solvent.

14. The brush according to claims 9 or 10, wherein the conditioning material comprises at least one extract from at least one material selected from the group consisting of fruit, furs, fibers, seeds, flower petals, insects, bird feathers, and leaves.

15. The brush according to claims 9 or 10, wherein the conditioning material comprises at least one material selected from the group consisting of an oil, petrolatum, paraffin, ceresin, ozokerite, microcrystalline wax, polyethylene, and perhydrosqualene, dimethyl polysiloxane, methylphenyl polysiloxane, silicone glycol copolymer, water-soluble silicone glycol copolymer, triglyceride ester, vegetable fat, animal fat, vegetable oil, animal oil, castor oil, safflower oil, cotton seed oil, corn oil, olive oil, cod liver oil, almond oil, avocado oil, palm oil, sesame oil, soybean oil, caprylic triglyceride, capric triglyceride, isostearic triglyceride, adipic triglyceride, wheat germ oil, hydrogenated vegetable oil, petrolatum, branched-chain hydrocarbon, alcohol, ester, castor oil, lanolin oil, palm kernel oil, rapeseed oil, safflower oil, jojoba oil, evening primrose oil, mineral oil, sheabutter, octylpalmitate, maleated soybean oil, glycerol trioctanoate, diisopropyl dimerate, isocetyl citrate, non-volatile silicone oil, dimethicone, phenyl dimethicone, cyclomethicone, poly(perfluoroalkyl)siloxane, linear polyalkyl siloxane, cyclic polyalkyl siloxane, caprylic triglyceride, capric triglyceride, isostearic triglyceride, castor oil, adipic triglyceride, diisopropyl dimerate, dimethicone, octyl dodecanol, oleyl alcohol, maleated soybean oil, polybutene, oleyl alcohol, hexadecyl alcohol, wheat germ glyceride and benzotriazole.

16. The brush according to claims 9 or 10, wherein the conditioning material comprises at least one material selected from the group consisting of an emollient, humectant, occlusive lanolin, anhydrous lanolin, synthetic lanolin derivatives, modified lanolins, isopropyl palmitate, isononyl isononanoate, isopropyl isostearate, cetyl ricinoleate, octyl palmitate, cetyl ricinoleate, glyceryl trioctanoate, diisopropyl dimerate, propylene glycol, polyglycerol esters, myristyl acetate, isopropyl myristate, diethyl sebacate; diisopropyl adipate; tocopheryl acetate; tocopheryl linoleate; hexadecyl stearate; ethyl lactate; cetyl lactate, cetyl oleate, octyl hydroxystearate; octyl dodecanol, decyl oleate, propylene glycol ricinoleate, isopropyl lanolate, pentaerythrityl tetrastearate, neopentylglycol dicaprylate/dicaprate, hydrogenated cocoglycerides, isotridecyl isononanoate, isononyl isononanoate, myristal myristate, triisocetyl citrate, cetyl alcohol, octyl dodecanol, and oleyl alcohol.

17. The brush according to claims 9 or 10, wherein the conditioning material comprises at least one material selected from the group consisting of a cyclomethicone, cyclomethicone having 3 membered ring, cyclomethicone having 4 membered ring, cyclomethicone having 5 membered ring structures, 244 Fluid from Dow Corning Corporation, 344 Fluid from Dow Corning Corporation, 345 Fluid from Dow Corning Corporation, poly(organosiloxane) fluid, silicone fluids having non-end groups, silicone fluids with non-end groups and fluoroalkyl, Dow Corning as the 1265 fluids, General Electric SF-1153 fluids, General Electric 1265 Fluid Series, silicone fluids with the non-end groups and allyl groups, silicone fluids with the non-end groups and phenyl groups, 556 Series fluids from Dow Corning, poly(organosiloxane), poly(dimethylsiloxane), poly(phenylmethylsiloxane), poly(fluoroalkylmethylsiloxane), poly(dimethylsiloxane) copolymers, dimethicone, phenyl dimethicone, and phenyl trimethicone.

18. The brush according to claims 9 or 10, wherein the conditioning material comprises at least one material selected from the group consisting of an acetoglyceride ester, acetylated monoglyceride, ethoxylated glyceride, ethoxylated glycerylmonostearate, alkyl ester of fatty acids having 1 to 20 carbon atoms, methyl ester of fatty acid, ethyl ester of fatty acid, isopropyl ester of fatty acid, butyl ester of fatty acid, alkyl ester, hexyl laurate, isohexyl laurate, iso-hexyl palmitate, isopropyl palmitate, decyl oleate, isodecyl oleate, hexadecyl stearate, decyl stearate, isopropyl isostearate, diisopropyl adipate, dissohexyl adipate, di-hexyldecyl adipate, diisopropyl sebacate, lauryl lactate, myristyl lactate, cetyl lactate, alkenyl ester of fatty acid having 1 to 20 carbon atoms, oleyl myristate, oleyl stearate, oleyl oleate, fatty acid having 1 to 20 carbon atoms, pelargonic acid, lauric acid, myristic acid, palmitic acid, stearic acid, isostearic acid, hydroxystearic acid, oleic acid, linoleic acid, ricinoleic acid, arachidic acid, behenic acid, erucic acid, fatty alcohol having 1 to 20 carbon atoms, lauryl alcohol, myristyl alcohol, cetyl alcohol, hexadecyl alcohol, stearyl alcohol, isostearyl alcohol, hydroxystearyl alcohol, oleyl alcohol, ricinoleyl alcohol, behenyl alcohol, erucyl alcohol, 2-octyl dodecanol, fatty alcohol ether, ethoxylated fatty alcohols of 1 to 20 carbon atoms, ether-esters, and fatty acid ester of ethoxylated fatty alcohol.

19. The brush according to claims 9 or 10, wherein the conditioning material comprises at least one material selected from the group consisting of a lanolin, lanolin oil, lanolin wax, anhydrous lanolin, lanolin alcohol, lanolin fatty acid, isopropyllanolate, ethoxylated lanolin, ethoxylated lanolin alcohol, ethoxolated cholesterol, propoxylated lanolin alcohol, acetylated lanolin, acetylated lanolin alcohol, lanolin alcohol linoleate, lanolin alcohol recinoleate, acetate of lanolin alcohol recinoleate, acetate of lanolin alcohol recinoleate, acetate of ethoxylated alcohols ester, hydrogenolysis of lanolin, ethoxylated hydrogenated lanolin, and ethoxylated sorbitol lanolin.

20. The brush according to claims 9 or 10, wherein the conditioning material comprises at least one material selected from the group consisting of a polyhydric alcohol, polyether derivative, propylene glycol, dipropylene glycol, polypropylene glycol, polypropylene glycol 2000, polypropylene glycol 4000, polyoxyethylene glycol, polyoxypropylene glycol, glycerol, sorbitol, ethoxylated sorbitol, hydroxypropylsorbitol, polyethylene glycol, polyethylene glycol 200, polyethylene glycol 6000, methoxy polyethylene glycol, methoxy polyethylene glycol 350, methoxy polyethylene glycol 550, methoxy polyethylene glycol 750, methoxy polyethylene glycol 2000, methoxy polyethylene glycol 5000, poly[ethylene oxide] homopolymer, poly[ethylene oxide] homopolymer 100,000, poly[ethylene oxide] homopolymer 5,000,000, polyalkylene glycol, hexylene glycol (2-methyl-2,4-pentanediol), 1,3-butylene glycol, 1,2,6-hexanetriol, ethohexadiol USP (2-ethyl,3-hexanediol), C15 vicinal glycol, C16 vicinal glycol, C17 vicinal glycol, C18 vicinal glycol, and polyoxypropylene derivative of trimethylolpropane.

21. The brush according to claims 9 or 10, wherein the conditioning material comprises at least one material selected from the group consisting of a polydydric alcohol ester, ethylene glycol mono fatty acid esters, ethylene glycol di-fatty acid ester, diethylene glycol, polypropylene glycol monooleate, polypropylene glycol 2000 monooleate, polypropylene glycol 2000 monostearate, polypropylene glycol 2000 monostearate, ethoxylatedpropylene glycol monostearate, glyceryl mono-fatty acid ester, glyceryl di-fatty acid ester, polyglycerol poly-fatty acid ester, ethoxylated glyceryl monostearate, 1,3-butylene glycolmonostearate, 1,3-butylene glycol distearate, polyoxyethylene polyol fatty acid ester, sorbitan fatty acid ester, and polyoxyethylene sorbitan fatty acid ester.

22. The brush according to claims 9 or 10, wherein the conditioning material comprises at least one material selected from the group consisting of a wax, natural wax, synthetic wax, mineral wax, beeswax, spermaceti, lanolin, shellac wax, carnauba, candelilla, bayberry, sugarcane wax, ozokerite, ceresin, montan, paraffin, microcrystalline wax, petroleum and petrolatum wax, polyoxyethylene glycol, carbowax available from Carbide, carbowax available from Carbon Chemicals company, Fischer-Tropsch waxes, Rosswax, available from Ross company, PT-0602 available from Astor Wax Company, microcrystalline wax, and silicone wax.

23. The brush according to claims 9 or 10, wherein the conditioning material comprises at least one material selected from the group consisting of a phospholipid, lecithin, cholesterol, cholesterol fatty acid ester, fatty acid amide, ethoxylated fatty acid amide, and fatty acid alkanolamides.

24. The brush according to claims 9 or 10, wherein the conditioning material comprises at least one material selected from the group consisting of a polyoxyethylene polyoxypropylene block polymers, Poloxamer 407, polyoxypropylene-3-myristyl ether, Promyristyl PM3, polyalkylene glycol monobutyl ether, and UCON lubricant 50 HB 100.

25. An electrical interface comprising a moving contact surface; and an electrical fiber brush in electrical contact with the moving contact surface, the brush comprising, plural conductive elements, at least one conditioning material disposed on interior ones of the plural conductive elements and in contact with the moving contact surface, a thickness of the conditioning material on the plural conductive elements ranges from $S_C$=0.01 μm to 15 μm, the conditioning material having a composition such that, when in sliding contact with a moving contact surface, the conditioning material has an average film thickness on the contact surface of S from several atomic layers to 1 μm, so that current is conducted over a fractional conducting area $f_C$ of the contact surface S, where $0.01 \leqq f_C \leqq 1$, and a foot print of the conductive elements having a current conductive area in which a film thickness $S_i$ is 1.0 nm$\leqq S_i \leqq$12 nm thick.

26. The electrical interface of claim 25, wherein:

the conditioning material coated on the conductive elements has an average thickness of from $S_C$=0.05 μm to 3 μm;

the conditioning material on the moving contact surface has an average film thickness S less than 500 nm;

$0.03 \leqq f_C \leqq 1$; and $S_i \leqq 10$ nm.

27. The electrical interface of claim 26, wherein:

$S_i \leqq 12$ nm.

28. An electrical brush for electrically contacting a moving contact surface, comprising:

plural conductive elements;

at least one conditioning material disposed on interior ones of the plural conductive elements and in contact with the moving contact surface;

a thickness of the conditioning material on the plural conductive elements ranges from $S_C$=0.01 μm to 15 μm;

the conditioning material having a composition such that, when in sliding contact with a moving contact surface, the conditioning material has an average film thickness on the contact surface of S from several atomic layers to 1 μm, so that current is conducted over a fractional conducting area $f_C$ of the contact surface S, where $0.01 \leqq f_C \leqq 1$;

a foot print of the conductive elements having a current conductive area in which a film thickness $S_i$ is 1.0 nm$\leqq S_i \leqq$12 nm thick; and said at least one conditioning material comprising a solvent-transported dielectric material deposited from a solution onto the at least one conductive element.

29. The brush of claim 28, wherein the at least one conditioning material coated on the plural conductive elements has a thickness in a range of from $S_C$=0.01 μm to 15 μm.

30. The brush of claim 29, wherein the dielectric material has a composition such that, when in sliding contact with a moving contact surface, the dielectric material has an average film thickness on the contact surface of S from several atomic layers to 1 μm, so that current is conducted over a conducting area $f_C$ of the contact surface S where $0.01 \leqq f_C \leqq 1$, of a foot print of the conductive element in a current conductive area in which the film thickness $S_i$ is 1.0 nm$\leqq S_i \leqq$12 nm thick.

31. An electrical brush for electrically contacting a moving contact surface and having plural conductive elements, at least one conditioning material disposed on interior ones of the plural conductive elements and in contact with the moving contact surface, the at least one conditioning material including a dielectric material including at least one of a lanoline compound, a triazole compound, and a scotchguard compound, said at least one conditioning material formed on the at least one conductive element by the process comprising:

dissolving the dielectric material in a solvent to produce a solution of the dielectric material and the solvent;

applying the solution to the plural conductive elements; and removing substantially all the solvent to infiltrate into the plural conductive elements a solvent-transported dielectric material including at least one of the lanoline compound, the triazole compound, and the scotchguard compound on said end of the at least one conductive element toward the moving contact surface, wherein the dielectric material has a composition such that, when in sliding contact with a moving contact surface, the dielectric material has an average film thickness on the contact surface of S from several atomic layers to 1 μm, so that current is conducted over a fractional conducting area $f_C$ of the contact surface S, where $0.01 \leqq f_C \leqq 1$, of a foot print of the conductive element in a current conductive area in which the film thickness $S_i$ is 1.0 nm$\leqq S_i \leqq$12 nm thick.

32. The brush of claim 31, wherein the dielectric material coated on the conductive elements has a thickness in a range of from $S_C$=0.01 μm to 15 μm.

* * * * *